US012702970B2

(12) United States Patent
Stahl et al.

(10) Patent No.: US 12,702,970 B2
(45) Date of Patent: Aug. 11, 2026

(54) SYNTHESIS OF ATOMICALLY DISPERSED M—N—C CATALYSTS VIA SELECTIVE METALATION

(71) Applicant: WISCONSIN ALUMNI RESEARCH FOUNDATION, Madison, WI (US)

(72) Inventors: Shannon Stahl, Madison, WI (US); Jason Bates, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 16 days.

(21) Appl. No.: 17/885,205

(22) Filed: Aug. 10, 2022

(65) Prior Publication Data

US 2023/0067623 A1 Mar. 2, 2023

Related U.S. Application Data

(60) Provisional application No. 63/231,334, filed on Aug. 10, 2021.

(51) Int. Cl.

| | |
|---|---|
| ***B01J 31/16*** | (2006.01) |
| ***B01J 21/18*** | (2006.01) |
| ***B01J 37/02*** | (2006.01) |
| ***B01J 37/08*** | (2006.01) |
| ***C25B 11/075*** | (2021.01) |

(52) U.S. Cl.

CPC ........... *B01J 31/1691* (2013.01); *B01J 21/18* (2013.01); *B01J 37/0203* (2013.01); *B01J 37/0205* (2013.01); *B01J 37/0209* (2013.01); *B01J 37/08* (2013.01); *C25B 11/075* (2021.01); *B01J 2235/00* (2024.01); *B01J 2235/05* (2024.01); *B01J 2235/15* (2024.01)

(58) Field of Classification Search

None

See application file for complete search history.

(56) References Cited

U.S. PATENT DOCUMENTS

2019/0386318 A1* 12/2019 Li ........................ B01J 31/1691
2022/0069315 A1* 3/2022 Wu ..................... H01M 8/1004

FOREIGN PATENT DOCUMENTS

EP 3118926 A1 * 1/2017 ............ H01M 12/02

OTHER PUBLICATIONS

Xie et al. ACS Catalysis, 9, 2019, 2718-2724 (Year: 2019).*

(Continued)

*Primary Examiner* — Yun Qian
(74) *Attorney, Agent, or Firm* — Quarles & Brady LLP

(57) ABSTRACT

A method of making an M-N—C catalyst is disclosed. The method includes the steps of (a) contacting an N-doped carbon support with a basic solution that includes a metal salt, whereby the N-doped carbon support is metalated by the metal cation of the metal salt to form one or more chelated metal-nitrogen complexes ($MN_x$ species); and (b) subsequently contacting the metalated N-doped carbon support with an acid, whereby the one or more $MN_x$ species formed on the N-doped carbon support in step (a) remain intact while other species are removed. The resulting composition may be catalytically activated by heat treating the composition. The activated catalyst may be used to catalyze a wide range of chemical reactions.

12 Claims, 14 Drawing Sheets

(56) References Cited

OTHER PUBLICATIONS

Xie et al. ACS Catalysis, supporting information). (Year: 2019).*
Adler, A. D.; Longo, F. R.; Kampas, F.; Kim, J. On the Preparation of Metalloporphyrins. J. Inorg. Nucl. Chem. 1970, 32(7), 2443-2445.
Bergerhoff, G. & Brown, I.D. in "Crystallographic Databases", F.H. Allen et al. (Hrsg.) Chester, International Union of Crystallography 1987.
Ferrandon, M.; Wang, X.; Kropf, A. J.; Myers, D. J.; Wu, G.; Johnston, C. M.; Zelenay, P. Stability of Iron Species in Heat-Treated Polyaniline-Iron-Carbon Polymer Electrolyte Fuel Cell Cathode Catalysts. Electrochim. Acta 2013, 110, 282-291.
Franco, F.; Rettenmaier, C.; Jeon, H. S.; Cuenya, B. R. Transition Metal-Based Catalysts for the Electrochemical CO2 Reduction: From Atoms and Molecules to Nanostructured Materials. Chem. Soc. Rev. 2020, 49, 6884-6946.
G. Brauer, in: Handbook of Preparative Inorganic Chemistry, Academic Press, New York, 1963, p. 1508.
Gerken, J. B.; Stamoulis, A.; Suh, S.-E.; Fischer, N. D.; Kim, Y. J.; Guzei, I. A.; Stahl, S. S. Efficient Electrochemical Synthesis of Robust, Densely Functionalized Water Soluble Quinones. Chem. Commun. 2020, 56, 1199-1202.
He, Y.; Shi, Q.; Shan, W.; Li, X.; Kropf, A. J.; Wegener, E. C.; Wright, J.; Karakalos, S.; Su, D.; Cullen, D. A.; Wang, G.; Myers, D. J.; Wu, G. Dynamically Unveiling Metal-Nitrogen Coordination during Thermal Activation to Design High- Efficient Atomically Dispersed CoN4 Active Sites. Angew. Chem., Int. Ed. 2021, 60, 9516-9526.
Iglesia, E. Formic Acid Decomposition on Copper, Nickel, and Copper-Nickel Alloys. Thesis, Stanford University, 1981. Appendix B.
Jagadeesh, R. V.; Junge, H.; Beller, M. Green Synthesis of Nitriles Using Non-Noble Metal Oxides-Based Nanocatalysts. Nat. Commun. 2014, 5, 4123.
Jagadeesh, R. V.; Junge, H.; Pohl, M.-M.; Radnik, J.; Brückner, A.; Beller, M. Selective Oxidation of Alcohols to Esters Using Heterogeneous Co3O4—N@C Catalysts under Mild Conditions. J. Am. Chem. Soc. 2013, 135, 10776-10782.
Jaouen, F.; Dodelet, J.-P. Average Turn-over Frequency of O2 Electro-Reduction for Fe/N/C and Co/N/C Catalysts in PEFCs. Electrochim. Acta 2007, 52, 5975-5984.
Jaouen, F.; Proietti, E.; Lefèvre, M.; Chenitz, R.; Dodelet, J.-P.; Wu, G.; Taek Chung, H.; Marie Johnston, C.; Zelenay, P. Recent Advances in Non-Precious Metal Catalysis for Oxygen-Reduction Reaction in Polymer Electrolyte Fuel Cells. Energy Environ. Sci. 2011, 4, 114-130.
Jiao, L.; Li, J.; Richard, L. L.; Sun, Q.; Stracensky, T.; Liu, E.; Sougrati, M. T.; Zhao, Z.; Yang, F.; Zhong, S.; Xu, H.; Mukerjee, S.; Huang, Y.; Cullen, D. A.; Park, J. H.; Ferrandon, M.; Myers, D. J.; Jaouen, F.; Jia, Q. Chemical Vapour Deposition of Fe—N—C Oxygen Reduction Catalysts with Full Utilization of Dense Fe—N4 Sites. Nat. Mater. 2021, 20, 1385-1391.
Li, J.; Jiao, L.; Wegener, E.; Richard, L. L.; Liu, E.; Zitolo, A.; Sougrati, M. T.; Mukerjee, S.; Zhao, Z.; Huang, Y.; Yang, F.; Zhong, S.; Xu, H.; Kropf, A. J.; Jaouen, F.; Myers, D. J.; Jia, Q. Evolution Pathway from Iron Compounds to Fe1(II)-N4 Sites through Gas-Phase Iron during Pyrolysis. J. Am. Chem. Soc. 2020, 142, 1417-1423.
Lu, J.; Hai, X.; Xi, S.; Mitchell, S.; Harrath, K.; Xu, H.; Akl, D.; Kong, D.; Li, J.; Li, Z.; et al. Scalable Two-Step Annealing Method for Preparing Ultra-High-Density Single-Atom Catalyst Libraries. Nat. Nanotechnol. 2022, 17, 174-181.
Mehmood, A.; Pampel, J.; Ali, G.; Ha, H. Y.; Ruiz-Zepeda, F.; Fellinger, T.-P. Facile Metal Coordination of Active Site Imprinted Nitrogen Doped Carbons for the Conservative Preparation of Non-Noble Metal Oxygen Reduction Electrocatalysts. Adv. Energy Mater. 2018, 8, 1701771.
Menga, D.; Ruiz-Zepeda, F.; Moriau, L.; Šala, M.; Wagner, F.; Koyutürk, B.; Bele, M.; Petek, U.; Hodnik, N.; Gaberšček, M.; et al. Active-Site Imprinting: Preparation of Fe—N—C Catalysts from Zinc Ion-Templated Ionothermal Nitrogen-Doped Carbons. Adv. Energy Mater. 2019, 9, 1902412.
Primbs, M.; Sun, Y.; Roy, A.; Malko, D.; Mehmood, A.; Sougrati, M.-T.; Blanchard, P.-Y.; Granozzi, G.; Kosmala, T.; Daniel, G.; Atanassov, P.; Sharman, J.; Durante, C.; Kucernak, A.; Jones, D.; Jaouen, F.; Strasser, P. Establishing Reactivity Descriptors for Platinum Group Metal (PGM)-Free Fe—N—C Catalysts for PEM Fuel Cells. Energy Environ. Sci. 2020, 13, 2480-2500.
Sougrati, M. T.; Goellner, V.; Schuppert, A. K.; Stievano, L.; Jaouen, F. Probing Active Sites in Iron-Based Catalysts for Oxygen Electro-Reduction: A Temperature-Dependent 57Fe Mössbauer Spectroscopy Study. Catal. Today 2016, 262, 110-120.
Specchia, S.; Atanassov, P.; Zagal, J. H. Mapping Transition Metal-Nitrogen-Carbon Catalyst Performance on the Critical Descriptor Diagram. Curr. Opin. Electrochem. 2021, 27, 100687.
Tang, J.; Salunkhe, R. R.; Liu, J.; Torad, N. L.; Imura, M.; Furukawa, S.; Yamauchi, Y. Thermal Conversion of Core-Shell Metal-Organic Frameworks: A New Method for Selectively Functionalized Nanoporous Hybrid Carbon. J. Am. Chem. Soc. 2015, 137, 1572-1580.
Wu, G.; More, K. L.; Johnston, C. M.; Zelenay, P. High-Performance Electrocatalysts for Oxygen Reduction Derived from Polyaniline, Iron, and Cobalt. Science 2011, 332, 443-447.
Yao, S. A.; Hansen, C. B.; Berry, J. F. A Convenient, High-Yielding, Chromatography-Free Method for the Insertion of Transition Metal Acetates into Porphyrins. Polyhedron 2013, 58, 2-6.

* cited by examiner

Figure 1A

M, N, C precursor

Flowing $N_2$ or Ar

600–1050 °C

M—N—C

<2 wt% M $M_xO_y$ nanoparticles (remainder)

Flowing $N_2$

Figure 3A $1/2\ O_2$ +

30 °C 0.5 M $H_2SO_4$ 1.1 bar $O_2$ 50 mM $H_2Q$

+ $H_2O$

R = $\sim CH_2CH_2CH_2SO_3Na$

| | D1 | D2 |
|---|---|---|
| $\delta$ / mm $s^{-1}$ | 0.313 | 0.31 |
| $\Delta E_Q$ / mm $s^{-1}$ | 0.758 | 2.171 |
| FWHM / mm $s^{-1}$ | 0.8 | 0.8 |
| A% | 71% | 29% |

Figure 5A (cont.)

| | D1 | D2 | D3 | S1 |
|---|---|---|---|---|
| δ / mm $s^{-1}$ | 0.487 | 0.525 | 0.928 | 0.459 |
| $\Delta E_Q$ / mm $s^{-1}$ | 0.992 | 2.689 | 3.898 | 2.41 |
| FWHM / mm $s^{-1}$ | 0.821 | 0.821 | 0.821 | 0.814 |
| A% | 19% | 5% | 2% | 74% |

SYNTHESIS OF ATOMICALLY DISPERSED M—N—C CATALYSTS VIA SELECTIVE METALATION

CROSS-REFERENCE TO RELATED APPLICATIONS

This application claims the benefit of priority of U.S. Provisional Patent Application Ser. No. 63/231,334, filed Aug. 10, 2021, the contents of which is incorporated by reference in its entirety.

STATEMENT REGARDING FEDERALLY SPONSORED RESEARCH OR DEVELOPMENT

This invention was made with government support under DE-AC05-76RL01830 awarded by the US Department of Energy and GM137472 awarded by the National Institutes of Health. The government has certain rights in the invention.

FIELD

This disclosure relates generally to methods of synthesizing M-N—C catalysts. In particular, the disclosure is directed to new methods of selectively metalating N-containing sites (including, without limitation, macrocyclic $N_4$ sites) on the surface of supports that also contain carbon.

BACKGROUND

Earth-abundant metals incorporated into nitrogen-doped carbon (M-N—C) catalyze a variety of electrochemical reactions relevant to energy (e.g., $O_2$ reduction) and the environment (e.g., $CO_2$ reduction), as well as thermochemical reactions relevant to organic synthesis (e.g., methylesterification and nitrile synthesis). These broad reaction classes would all benefit from developing M-N—C catalysts with higher densities of active sites, which are thought to be atomically dispersed metals ligated by nitrogen ($MN_4$, typically).

Conventional methods for synthesizing M-N—C catalysts require high temperatures (>600° C.) to form porous N-doped carbon structures from organic precursors. When using such methods, the mobilization of mononuclear M species at ~600° C. leads to their aggregation concomitant with their stabilization at $N_4$ binding sites, resulting in a low practical limit for the density of surface-accessible atomically dispersed $MN_4$ (<1 wt %).

Recently developed gas-phase metalation methods decouple the formation of the underlying M-N support structure from the formation of $MN_x$ sites on the support structure surface (see, e.g., Jiao, L., et al. *Nat. Mater.* 2021, 20, 1385-1391). Using such methods, metal loading can be increased as high as ~2 wt %. However, such methods are limited to using M complexes that can be mobilized under gas-phase conditions and metalated at $N_4$ sites without unselective deposition, or where the unselectively deposited species can be magnetically separated. This greatly limits the range of potential M-N—C catalysts that can be synthesized using these methods.

He et al. (He, Y. et al. *Angew. Chem. Int. Ed.* 2021, 60, 9516-9526) recently reported a method of depositing Co onto a M-N support, wherein $Co(NO_3)_2$ is electrostatically adsorbed onto ZIF-8-derived N—C from an n-hexane solvent. However, such unselective deposition processes are limited by the same loading-dependent aggregation phenomena exhibited by 1-step pyrolysis methods.

Accordingly, there is a need in the art for improved methods of synthesizing M-N—C catalysts, wherein any metal can be selectively metalated to the surface of an M-N support. Ideally, in addition to being selective for any desired metal, such improved methods would facilitate the independent optimization of the M-N support synthesis and metalation steps, and would provide the potential to achieve higher weight loadings of $MN_4$.

SUMMARY

We disclose herein improved solution-phase methods for metalating M-N supports to produce active M-N—C catalysts, along with the improved catalysts that are produced using the method.

N—C supports are synthesized by high temperature heat treatment of precursor mixtures containing carbon and nitrogen. Macrocyclic $N_4$ sites on the surface of the N—C supports are metalated by contact with a basic solution containing a salt of the selected metal. The base within the solution, which may be attributed to a basic anion of the metal salt or to a separate base within the solution, drives the deprotonation equilibrium of protonated moieties that may exist in the binding sites.

The basic metalation conditions may lead to strong electrostatic adsorption of cationic metal species at deprotonated surface acidic moieties, which is an unselective deposition mode. A mild acid wash step removes these species, while leaving the previously-formed $MN_4$ complexes intact. A final heat treatment step is required to remove ligating solvents, anions, or other ligating species from the $MN_4$ sites, rendering the resulting composition catalytically active.

Accordingly, in a first aspect, the disclosure encompasses a method of making an M-N—C catalyst. The method includes the steps of (a) contacting an N-doped carbon support with a basic solution that includes a metal salt, whereby the N-doped carbon support is metalated by the metal cation of the metal salt to form a metalated N-doped carbon support comprising one or more chelated metal-nitrogen complexes ($MN_x$ species); and (b) contacting the metalated N-doped carbon support with an acid, whereby the one or more $MN_x$ species formed on the N-doped carbon support in step (a) remain intact.

In some embodiments, step (b) removes species that are capable of affecting the catalytic activity of the resulting catalyst.

In some embodiments, contacting the metalated N-doped carbon support with the acid in step (b) removes metal cations that are unselectively deposited onto or electrostatically adsorbed to the surface of the N-doped carbon support.

In some embodiments, the metal salt includes a basic anion. In some embodiments, the basic anion is selected from the group consisting of acetate and chloride.

In some embodiments, the basic solution further comprises a base. In some embodiments, the base is selected from the group consisting of trialkyl amine, alkali acetate, and any combination thereof. In some such embodiments, the metal salt does not include a basic anion.

In some embodiments, the basic solution further comprises a solvent selected from the group consisting of dimethyl formamide, chlorobenzene, and any combinations thereof. In some such embodiments, the solvent comprises chlorobenzene and dimethylformamide in a volume ratio from 1:2 to 5:1.

In some embodiments, step (a) occurs at a temperature of 150° C. or higher. In some embodiments, step (a) occurs at a temperature of from 150° C. to 250° C. In some embodiments, step (a) occurs at a temperature of from 150° C. to 240° C., from 150° C. to 230° C., from 150° C. to 220° C., from 150° C. to 210° C., from 150° C. to 205° C., from 150° C. to 200° C., from 150° C. to 195° C., from 150° C. to 190° C., from 150° C. to 185° C., from 150° C. to 180° C., from 150° C. to 175° C., from 150° C. to 170° C., from 150° C. to 165° C., from 150° C. to 160° C., or from 150° C. to 155° C.

In some embodiments, step (a) occurs at a temperature that is lower than 150° C., and the basic solution includes a strong base. In some such embodiments, step (a) occurs at a temperature that is lower than 100° C. In some such embodiments, step (a) occurs at a temperature that is lower than 50° C. In some such embodiments, step (a) occurs at a temperature that is lower than 30° C. In some such embodiments, the strong base is lithium bi(trimethylsilyl(amide).

In some embodiments, step (b) occurs at a temperature that is from 20° C. to 60° C. In some embodiments, step (b) occurs at a temperature that is from 20° C. to 55° C., from 20° C. to 50° C., from 20° C. to 45° C., from 20° C. to 40° C., from 20° C. to 35° C., from 20° C. to 30° C., or from 20° C. to 25° C. In some embodiments, step (b) occurs at a temperature that is lower than 30° C.

In some embodiments, the metal salt may include any metal cation. In some such embodiments, the metal salt is a transition metal salt, a noble metal salt, an actinide metal salt, a lanthanide metal salt, a rare earth metal salt, or an alkali metal salt. In some embodiments, the metal cation is selected from the group consisting of a $Ni^{2+}$, $Cu^{2+}$, $Zn^{2+}$, $Cr^{2+}$, $Mn^{2+}$, $Co^{2+}$, $Fe^{2+}$, $Fe^{3+}$, and any combination thereof.

In some embodiments, the method further includes the step of (c) heat treating the metalated N-doped carbon support formed in step (b), whereby the metalated N-doped carbon support becomes an activated M-N—C catalyst. In some such embodiments, the heat treating step is performed by heating the metalated N-doped carbon support formed in step (b) to a temperature of above 500° C.

In some such embodiments, step (c) is performed within an atmosphere consisting essentially of one or more non-reactive gases. In some such embodiments, the one or more non-reactive gases may include nitrogen, helium, argon, neon, krypton, xenon, or radon.

In some embodiments, step (c) is performed by heating the metalated N-doped carbon support formed in step (b) to a temperature between 600° C. and 1050° C. In some embodiments, step (c) is performed by heating the metalated N-doped carbon support formed in step (b) to a temperature between 600° C. and 1000° C., between 600° C. and 950° C., between 600° C. and 900° C., between 600° C. and 850° C., between 600° C. and 800° C., between 600° C. and 750° C., between 600° C. and 700° C., or between 600° C. and 650° C.

In some embodiments, the N-doped carbon support is made by heat treating a precursor mixture comprising carbon and nitrogen. In some such embodiments, the step of heat treating the precursor mixture is performed by heating the precursor mixture to a temperature between 600° C. and 1050° C., between 650° C. and 1050° C., between 700° C. and 1050° C., between 750° C. and 1050° C., between 800° C. and 1050° C., between 950° C. and 1050° C., or between 1000° C. and 1050° C.

In some embodiments, the step of heat treating the precursor mixture is performed within an atmosphere consisting essentially of one or more non-reactive gases. In some such embodiments, the one or more non-reactive gases may include nitrogen, helium, argon, neon, krypton, xenon, or radon.

In some embodiments, the precursor mixture includes one or more of ZIF-8 metal organic framework (MOF), polyaniline (PANT), 1,10-phenanthroline (Phen), or melamine (Mel).

In some embodiments, the N-doped carbon support includes one or more macrocyclic $N_4$ sites.

In some embodiments, the step of making the N-doped carbon support further includes optimizing the density of active sites on the surface of the N-doped carbon support. In some such embodiments, optimizing the density of active sites on the surface is performed by optimizing the nitrogen content, nitrogen configurations, and/or porosity of the N-doped carbon support.

In some embodiments, the M-N—C catalyst has a metal loading of from 0.3 wt % to 15 wt %, based on the total weight of the M-N—C catalyst. In some embodiments, the M-N—C catalyst has a metal loading of from 0.5 wt % to 15 wt %, from 0.6 wt % to 14 wt %, from 0.8 wt % to 13 wt %, from 0.9 wt % to 12 wt %, from 1.1 wt % to 11 wt %, from 1.2 wt % to 10 wt %, from 1.3 wt % to 9 wt %, or from 1.3 wt % to 8.5 wt %, based on the total weight of the M-N—C catalyst.

In a second aspect, the disclosure encompasses a method of making an M-N—C catalyst. The method includes the steps of (a) contacting an N-doped carbon support with a basic solution that includes a metal salt, whereby the N-doped carbon support is metalated by the metal cation of the metal salt to form a metalated N-doped carbon support comprising one or more chelated metal-nitrogen complexes ($MN_x$ species); and (b) removing metal cations that are unselectively deposited onto or electrostatically adsorbed to the N-doped carbon support.

In a third aspect, the disclosure encompasses a composition made by the method described above. In a related aspect, the disclosure encompasses a catalytic composition made by the method comprising steps (a), (b), and (c), as described herein.

In a fourth aspect, the disclosure encompasses a method of catalyzing a chemical reaction. The method includes the step of contacting one or more chemical reactants with the catalytic composition described above, whereby the chemical reaction is catalyzed and one or more desired chemical products are made.

In some embodiments, the chemical reaction that is catalyzed includes electrochemical reactions including oxygen reduction, carbon dioxide reduction, nitrogen reduction, and other reactions such as alcohol oxidation to aldehydes and ketones, alcohol oxidation to carboxylic acids, alcohol oxidation to esters, alcohol oxidation to primary amides, oxidative dehydrogenation of N-heterocycles, or alcohol oxidation to nitriles.

Other objects, features and advantages of the present invention will become apparent after review of the specification, claims and drawings.

BRIEF DESCRIPTION OF THE DRAWINGS

Figure 1A:
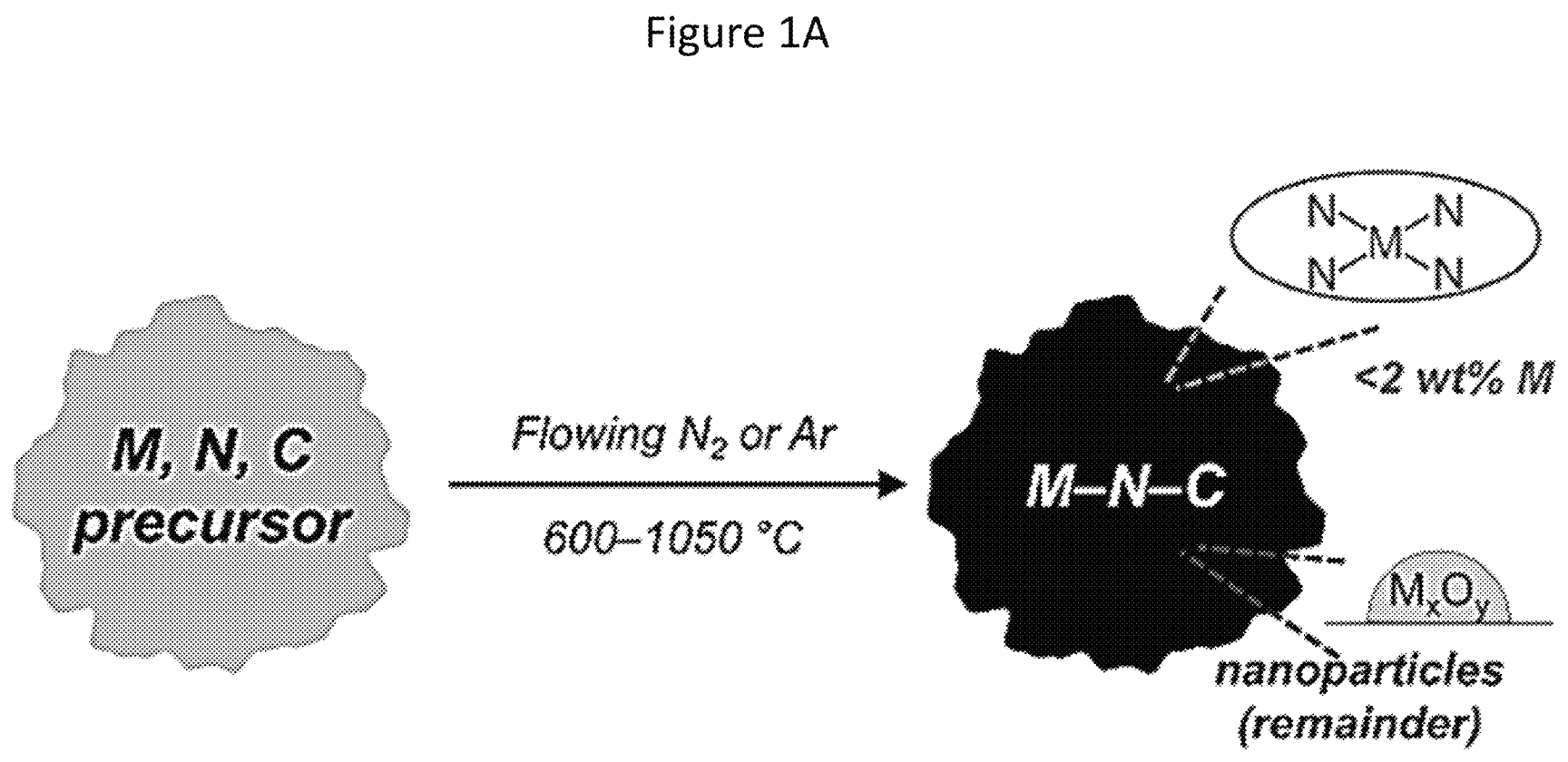

FIGS. 1A, 1B and 1C are schematic illustrations showing the development of M-N—C synthesis methods. FIG. 1A illustrates challenges associated with conventional one-step pyrolysis methods. FIG. 1B illustrates the molecular step associated with metalation of homogeneous macrocycles.

FIG. 1C illustrates the selective metalation of $N_4$ sites in N—C, an embodiment of the method disclosed in this application.

FIGS. 2A, 2B and 2C show the chemical equations for one embodiment of the disclosed method, including solution-phase metalation (FIG. 2A), post-synthetic acid wash (FIG. 2B), and post-synthetic thermal treatment (FIG. 2C).

FIG. 3A is the chemical equation for hydroquinone oxidation, which is used here as a catalytic probe reaction.

DETAILED DESCRIPTION

Figures 1B, 1C:
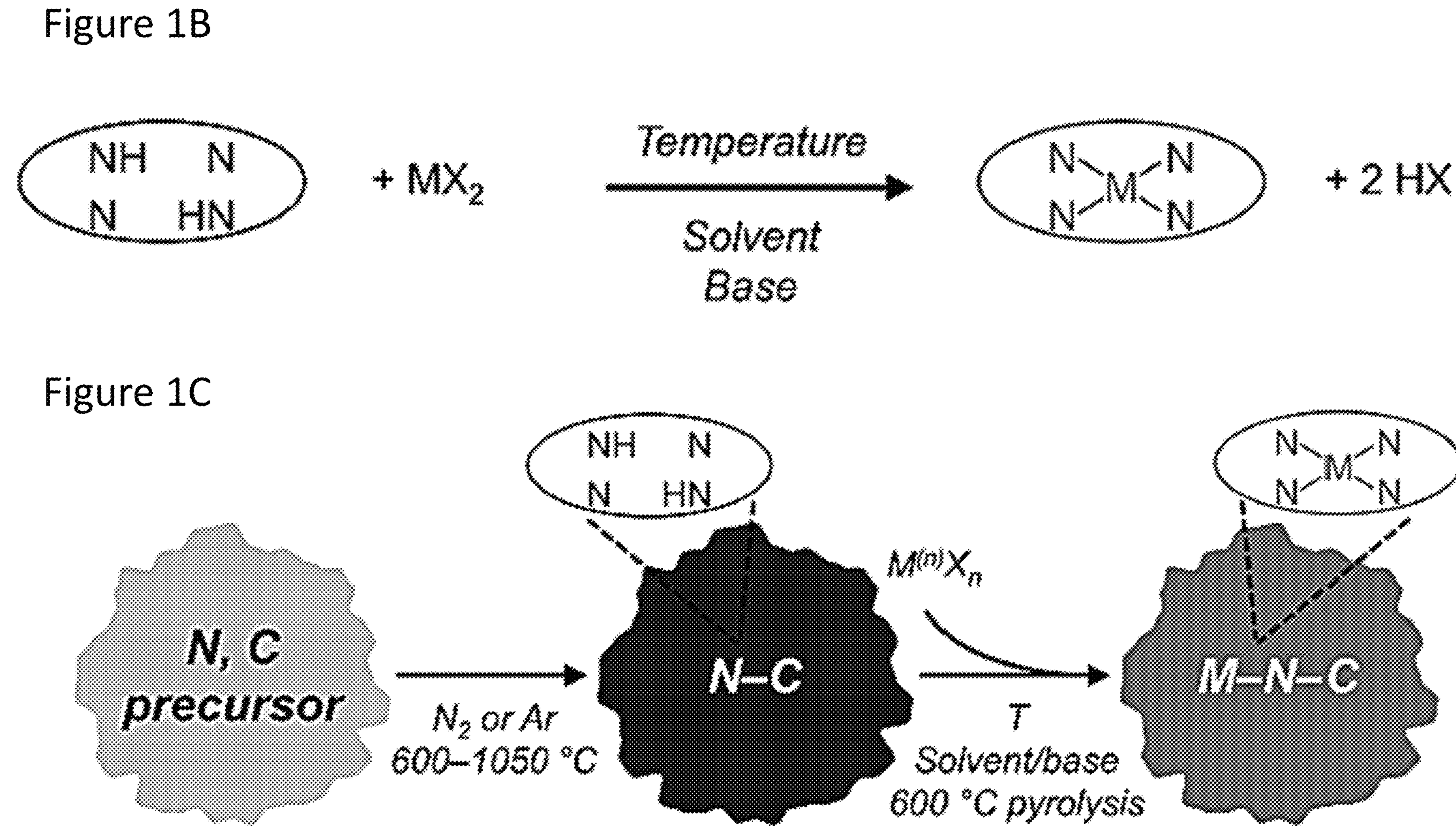

This disclosure is not limited to the particular methodology, protocols, materials, and reagents described, as these may vary. The terminology used herein is for the purpose of describing particular embodiments only, and is not intended to limit the scope of the invention.

As used herein and in the appended claims, the singular forms "a", "an", and "the" include the plural forms unless the context clearly dictates otherwise. As well, the terms "a" (or "an"), "one or more" and "at least one" can be used interchangeably, and the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, non-limiting specific methods and materials are now described. All publications and patents specifically mentioned herein are incorporated by reference for all purposes, including describing and disclosing the chemicals, instruments, statistical analysis and methodologies which are reported in the publications which might be used in connection with the invention. All references cited in this specification are to be taken as indicative of the level of skill in the art.

As used herein, the term "base" or "basic" refers to a non-charged compound or an anion of which the conjugate acid has a pKa in water measured at 23° C. of less than 15.7. As used herein, the term "strong base" refers to a non-charged compound or an anion of which the conjugate acid has a pKa in water measured at 23° C. of greater than 15.7. As used herein, the term "acid" or "acidic" refers to a non-charged compound or a cation of which the pKa in water measured at 23° C. is less than 15.7.

The term "alkyl" as contemplated herein includes a straight-chain or branched alkyl radical in all of its isomeric forms, such as a straight or branched group of 1-12, 1-10, or 1-6 carbon atoms, referred to herein as C1-C12 alkyl, C1-C10-alkyl, and C1-C6-alkyl, respectively.

The term "amine" is art-recognized and refers to both unsubstituted and substituted amines (e.g., mono-substituted amines or di-substituted amines), wherein substituents may include, for example, alkyl.

As used herein, the term "alkali" refers to an alkali metal in Group I of periodic table, such as, lithium, sodium, potassium, rubidium, cesium, and francium.

As used herein, the term "acetate" refers to the anion of $CH_3OC(O)^-$.

As used herein, the term "activated" catalyst refers to the actual form of catalyst that contributes to increasing the rate of a chemical reaction by decreasing the activation energy of the reaction. Such active form of a catalyst is usually obtained by subjecting an inactive form of the catalyst prior or during a reaction to a specific treatment (such as heating or photo-irradiation, etc.).

As used herein, "macrocyclic $N_4$ site" refers to the site where a metal is chelated with the four adjacent nitrogen atoms in a macrocyclic network (such as ZIF-8 metal organic framework (MOF), polyaniline (PANT), 1,10-phenanthroline (Phen), melamine (Mel), etc.).

As used herein, the term "metal loading" refers to the amount of metal that is chelated with more than one nitrogen at a chelation site in a macrocyclic network in a catalyst, based on the total amount of the catalyst.

As described above, we disclose herein improved solution-phase systems and methods for metalating nitrogen-doped carbon supports (N—C supports) to produce active M-N—C catalysts, along with the improved catalysts that result from practicing the method.

To review, macrocyclic $N_x$ sites on the surface of the N—C supports are metalated by contact with a basic solution containing a salt of the selected metal. The basic metalation conditions may lead to strong electrostatic adsorption of cationic metal species at deprotonated surface acidic moieties, which is an unselective deposition mode. A mild acid wash step removes these species, while leaving the previously-formed $MN_x$ complexes intact. A final heat treating step is required to remove ligating solvents, anions, or other ligating species from the $MN_x$ sites, rendering the resulting composition catalytically active.

There are a number of aspects of the disclosed method that makes it superior to previously known methods for making M-N—C catalysts, including, without limitation, its potential for modularity, its potential to selectively metalate the N—C support with any selected metal, and its potential to optimize the weight loading and/or other characteristics of the resulting catalyst.

A. Modularity

N—C support preparation and metalation occur in separate steps, which allows their independent optimization. Further, the equilibrium nature of that chemical steps that lead to metalation enables the method to be used to metalate the $MN_x$ sites of the N—C support with any metal that is stable at the temperature of metalation and in the solution used in the metalation step. Alternative metalation conditions can be optimized on a case-by-case basis, depending on the metal used and the desired characteristics of the final product. This adaptability is anticipated to lead to novel M-N—C materials based on metals that are not amenable to 1-step pyrolysis preparation strategies.

B. Selectivity

The choice of metalation conditions and acid washing steps leaves $MN_x$ species intact while removing all others. The formation of $MN_x$ sites prior to heat treatments avoids the aggregation inherent in pyrolysis treatments (>600° C.) with unselectively adsorbed M species. This improves performance in cases where nanoparticles catalyze unselective side-reactions, and enables fundamental reactivity comparisons among samples prepared with different metals and/or N—C supports.

C. Potential to Achieve Higher Weight Loadings of $MN_x$

Recognizing that the number of macrocyclic $N_x$ binding sites (such as $N_4$) on the N—C support limits the number of $MN_x$ sites in the final material, strategies to tailor the N content, N configurations, and porosity of the N—C support can potentially increase active site densities of the final product. Synthesis-structure-performance relationships with this level of control and specificity are not available for 1-step pyrolysis syntheses.

The following example is offered for illustrative purposes only, and is not intended to limit the scope of the present invention in any way. Indeed, various modifications of the invention in addition to those shown and described herein will become apparent to those skilled in the art from the foregoing description and the following examples and fall within the scope of the appended claims.

Example

Synthesis of Atomically Dispersed M-N—C Catalysts Via Solution Metalation

In this example, we present "proof of principle" for use of the disclosed methods to selectively metalate N-containing sites on an M-N scaffold. Using this method, selective metalation can be achieved for any metal, while avoiding the loading-dependent aggregation issues characteristic of conventional 1-step pyrolysis methods.

Introduction

Earth-abundant metals incorporated into nitrogen-doped carbon (M-N—C) catalyze a variety of electrochemical reactions relevant to energy (e.g., $O_2$ reduction[1]) and the environment (e.g., $CO_2$ reduction[2]), as well as thermochemical reactions relevant to organic synthesis (e.g., methylesterification,[3] nitrile synthesis[4]). These broad reaction classes would all benefit from developing catalysts with higher densities of active sites, which are thought to be atomically dispersed metals ligated by nitrogen ($MN_4$, typically).[1]

Common methods to synthesize M-N—C catalysts require high temperatures (>600° C.) to form porous N-doped carbon structures from organic precursors, but the mobilization of mononuclear M species at ~600° C. leads to their aggregation concomitant with their stabilization at $N_4$ binding sites,[5] resulting in a low practical limit for the density of atomically dispersed $MN_4$ when materials are synthesized in this way (<1 wt %, FIG. 1A).[6] Recently developed gas-phase metalation methods decouple the formation of the underlying support structure from the formation of $MN_4$ sites, whose loading can be increased as high as ~2 wt %;[7] yet, these methods are limited to compounds that can be mobilized under gas-phase conditions and whose nanoparticle phases can be magnetically separated from the product. In this example, we report the development of solution-phase metalation methods that are reminiscent of conditions used to metalate homogeneous macrocycles (FIGS. 1B and 1C).[8,9]

Experiments, Results and Discussion

N—C supports were synthesized by high-temperature pyrolysis of N, C precursor mixtures, including ZIF-8 metal-organic framework (MOF), polyaniline (PANI), and 1,10-phenanthroline (Phen). Macrocyclic $N_4$ sites on their surface were metalated with $CoCl_2$ in DMF solution (FIG. 2A), using tributylamine ($Bu_3N$) as a base to drive the deprotonation equilibrium of protonated moieties that may exist in the binding sites, and using elevated temperatures to accelerate the kinetics of the reaction.

Figures 2A, 2B:
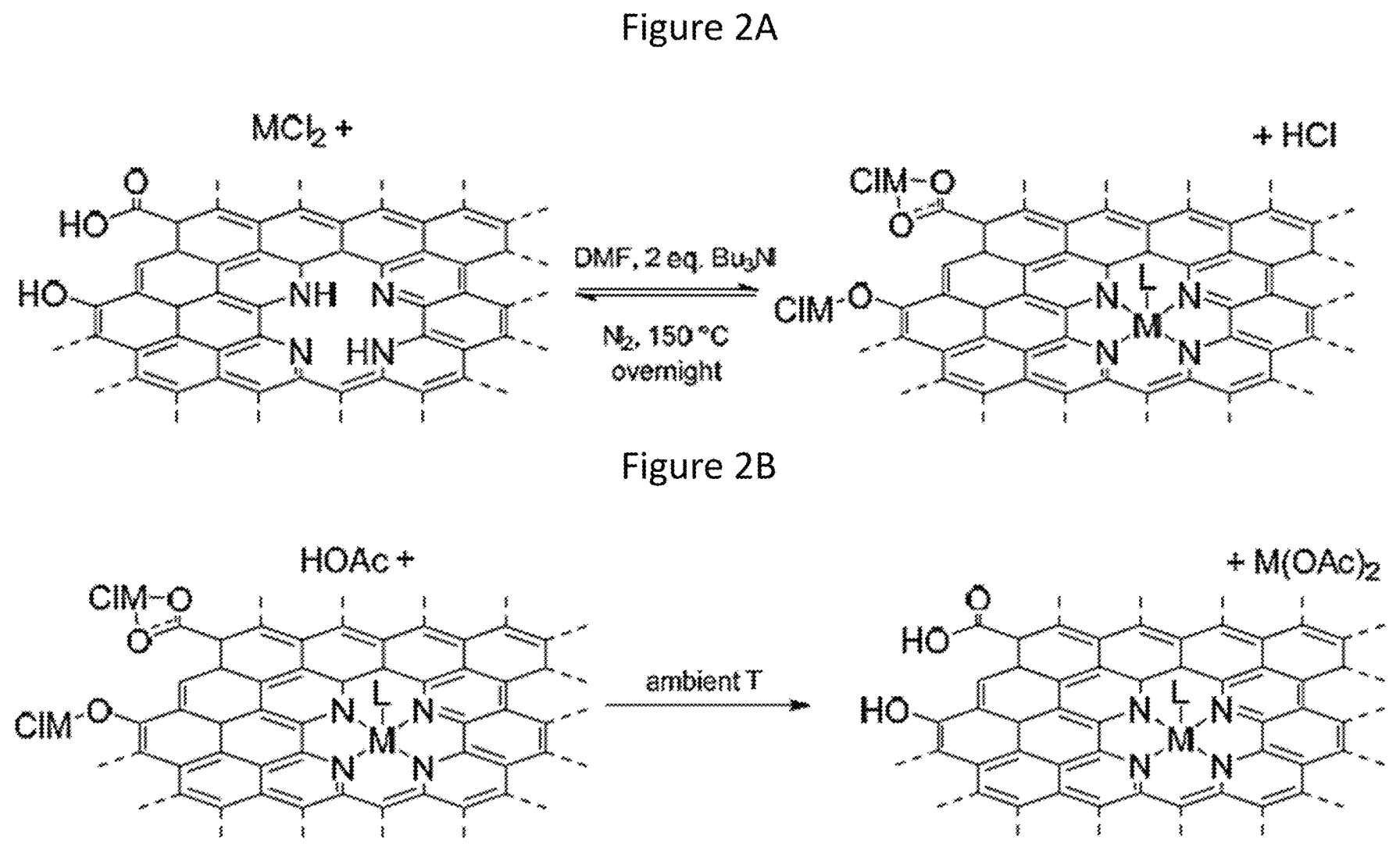
Figures 2C, 3A:
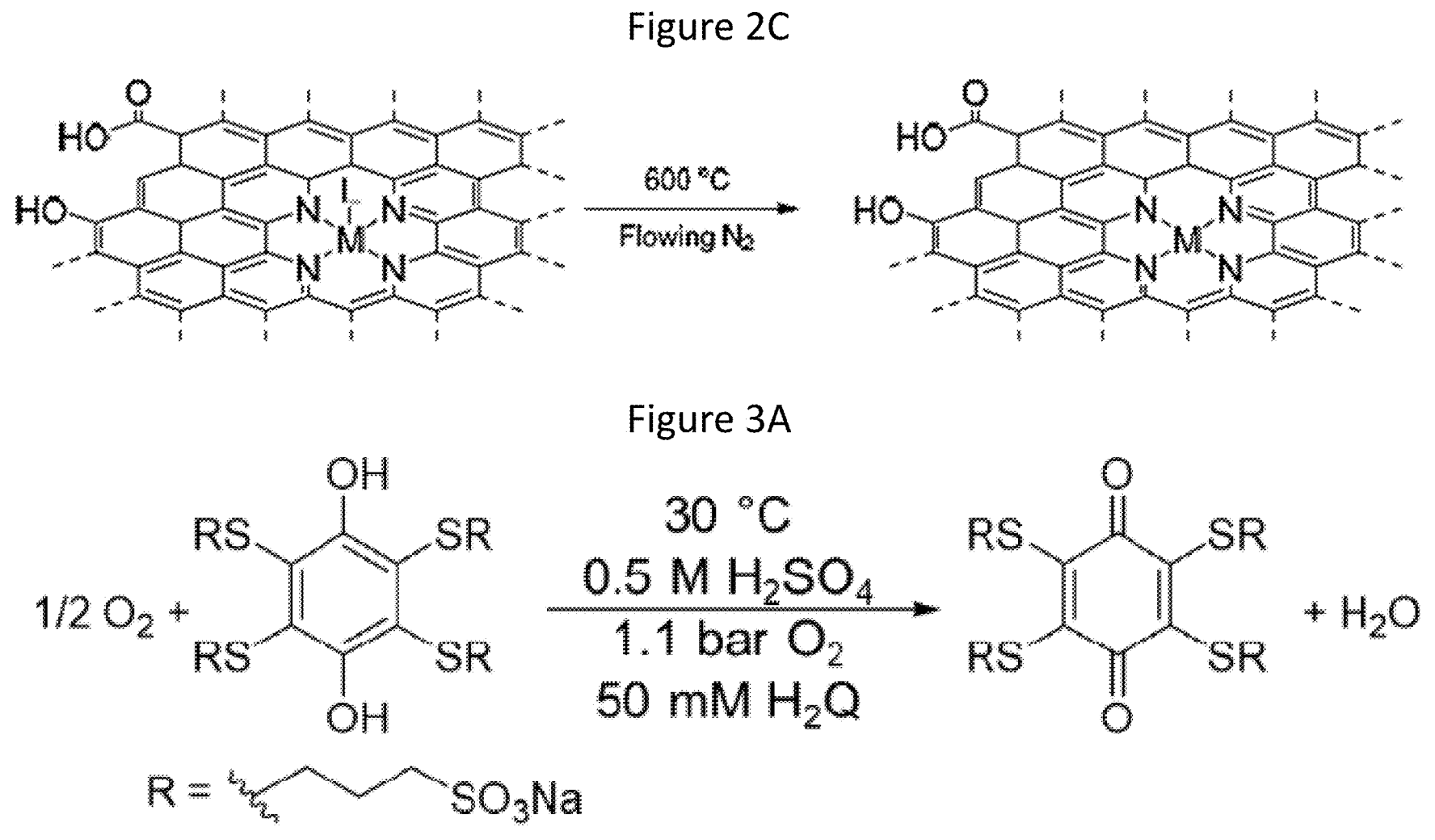

Yet, basic conditions may also lead to strong electrostatic adsorption of cationic Co(II) species at deprotonated surface acidic moieties, which is an unselective deposition mode. A mild acetic acid wash removes these species but leaves $CoN_4$ intact (FIG. 2B). A final pyrolysis step is required to remove ligating solvent or chloride from the $CoN_4$ site (FIG. 2C), rendering it catalytically active.

The use of base and recognizing the requirement for a final ligand removal step differentiates this method from previously reported metalation approaches.[10,11] This method also improves upon recently reported Co deposition strategies wherein $Co(NO_3)_2$ is electrostatically adsorbed on ZIF-8-derived N—C from n-hexane solvent,[12] because it targets metalation of $N_4$ sites during the metalation process, rather than during a later heat treatment. Such unselective electrostatic deposition processes are limited by the same loading-dependent aggregation phenomena that plague 1-step pyrolysis methods.

Figure 3B:
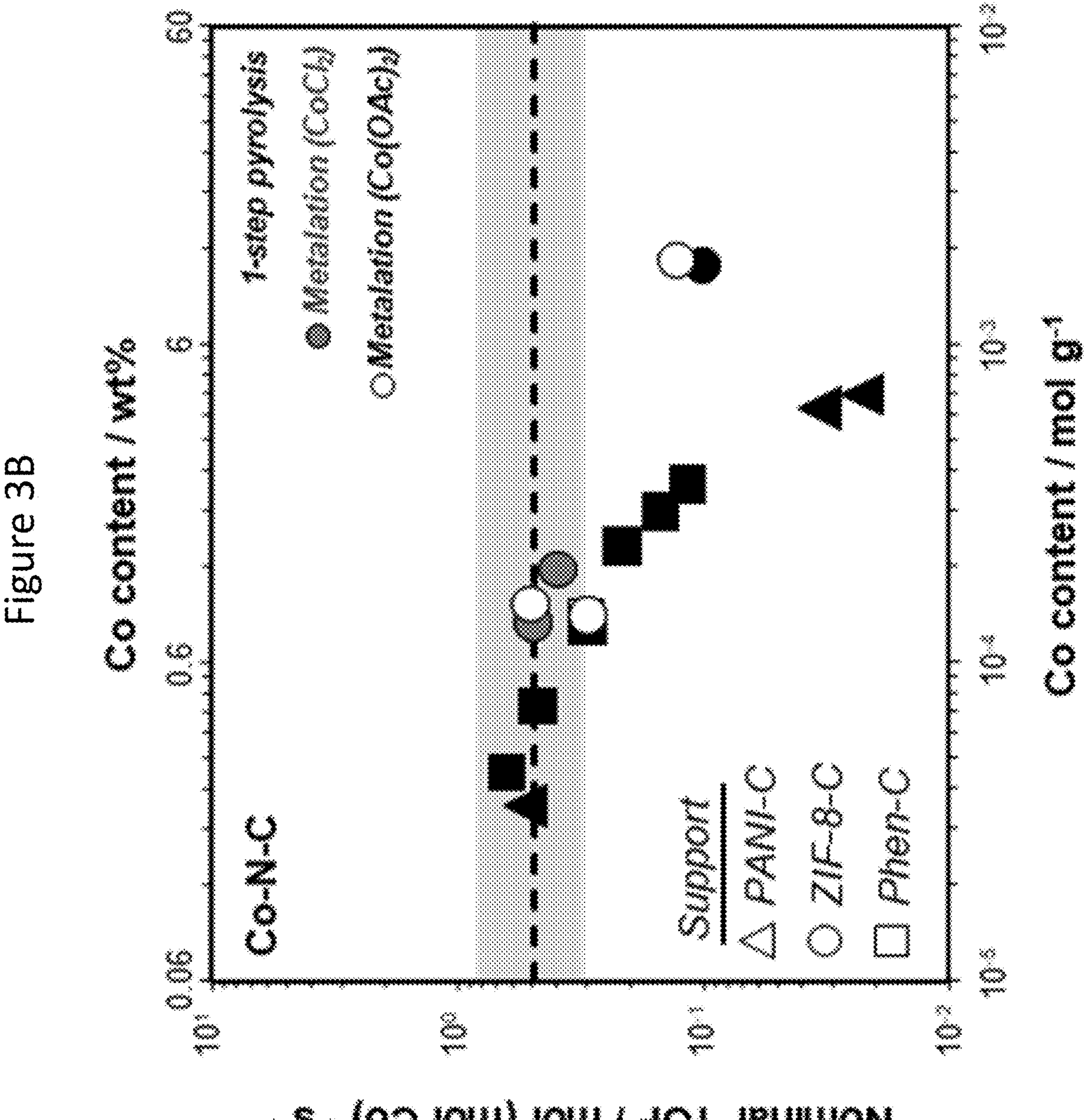
FIG. 3B is a graph showing hydroquinone oxidation nominal turnover frequencies (TOF, per total M) as a function of Co content in Co—N—C catalysts prepared by different routes (1-step pyrolysis, black; metalation ($MCl_2$), gray; metalation ($M(OAc)_2$), white). Dashed lines represent nominal TOF values inferred to be consistent with atomic dispersion.

Hydroquinone oxidation initial rates (FIG. 3A) were quantified as a probe reaction sensitive to atomically dispersed $MN_x$ sites, and ICP-OES quantification of the metal contents of samples prepared by one-step pyrolysis identifies samples with turnover frequency values (per total Co) that reach a maximum value of $0.5\ s^{-1}$ (dashed line, FIG. 3B) when they are prepared with progressively lower Co loadings. The similar nominal TOF values indicate that these samples have similar fractions of their total Co present as $CoN_4$ rather than inactive $CoO_x$, and because low loadings mitigate Co aggregation, it is inferred that this TOF value ($0.5\ s^{-1}$) corresponds to samples that contain predominantly $CoN_4$. Molecularly-inspired metalation of N—C derived from the pyrolysis of ZIF-8 with $CoCl_2$ leads to higher Co weight loadings (~1 wt %) at a nominal TOF of $0.5\ s^{-1}$ than those achievable by 1-step pyrolysis (~0.6 wt %).

An alternative metalation method reported in the homogeneous macrocycle literature[9] using $Co(OAc)_2$ and solid base ($K_2CO_3$, Soxhlet) under air was also successful (see the "Catalyst Synthesis" section of the Materials and Methods below for additional details). This method lacks an acid washing step, which may be the reason it led to unselective deposition when applied to a different N—C support derived from ZIF-8 mixed with KCl prior to pyrolysis (10 wt % Co sample in FIG. 3B).

Figure 3C:
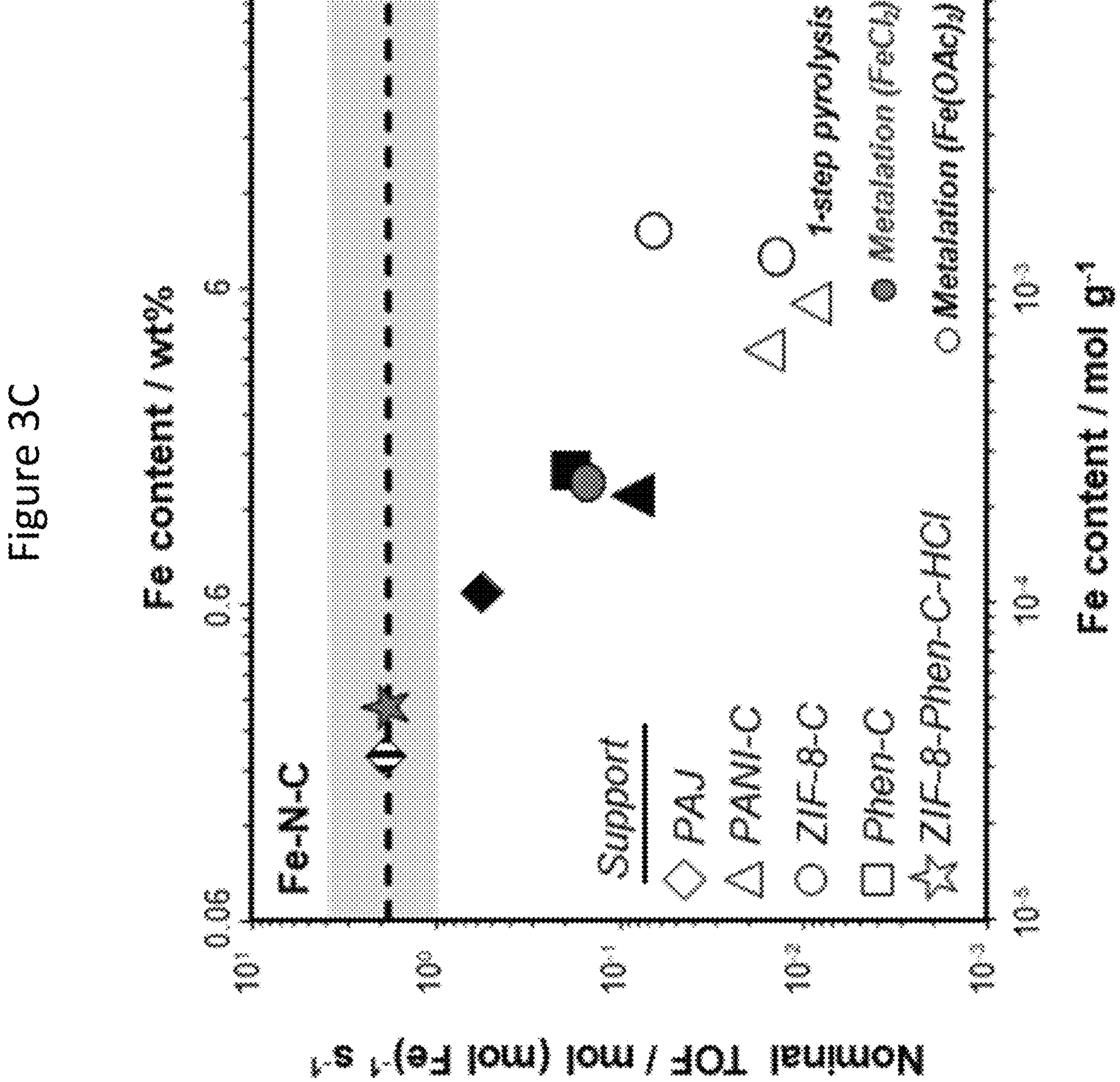
FIG. 3C is a graph showing nominal hydroquinone oxidation nominal turnover frequencies (TOF, per total M) as a function of Fe content in Fe—N—C catalysts prepared by different routes (1-step pyrolysis, black; metalation ($MCl_2$), gray; metalation ($M(OAc)_2$), white). The data point with vertical stripes represents the number of sites titrated by CO in pulse chemisorption measurements and the resulting TOF normalized to this value. Dashed lines represent nominal TOF values inferred to be consistent with atomic dispersion. Metalation of $FeCl_2$ on the ZIF-8-Phen-C—HCl support was prepared without heat treatment.

Fe—N—C materials were also prepared by one-step pyrolysis and metalation with $FeCl_2$ and $Fe(OAc)_2$, and their extent of atomic dispersion was assessed using hydroquinone oxidation (FIG. 3C). One commercially available material sourced from Pajarito Powder (product number PMF-011904, referred to as "PAJ Fe—N—C") has been reported[13] to possess 0.2 wt % of Fe as $FeN_4$ sites (of total 0.6 wt % Fe) by CO pulse chemisorption. Thus, this material serves as the benchmark for atomically dispersed Fe sites ($1.8\ s^{-1}$, pale red diamond, FIG. 3C).

Figure 4:
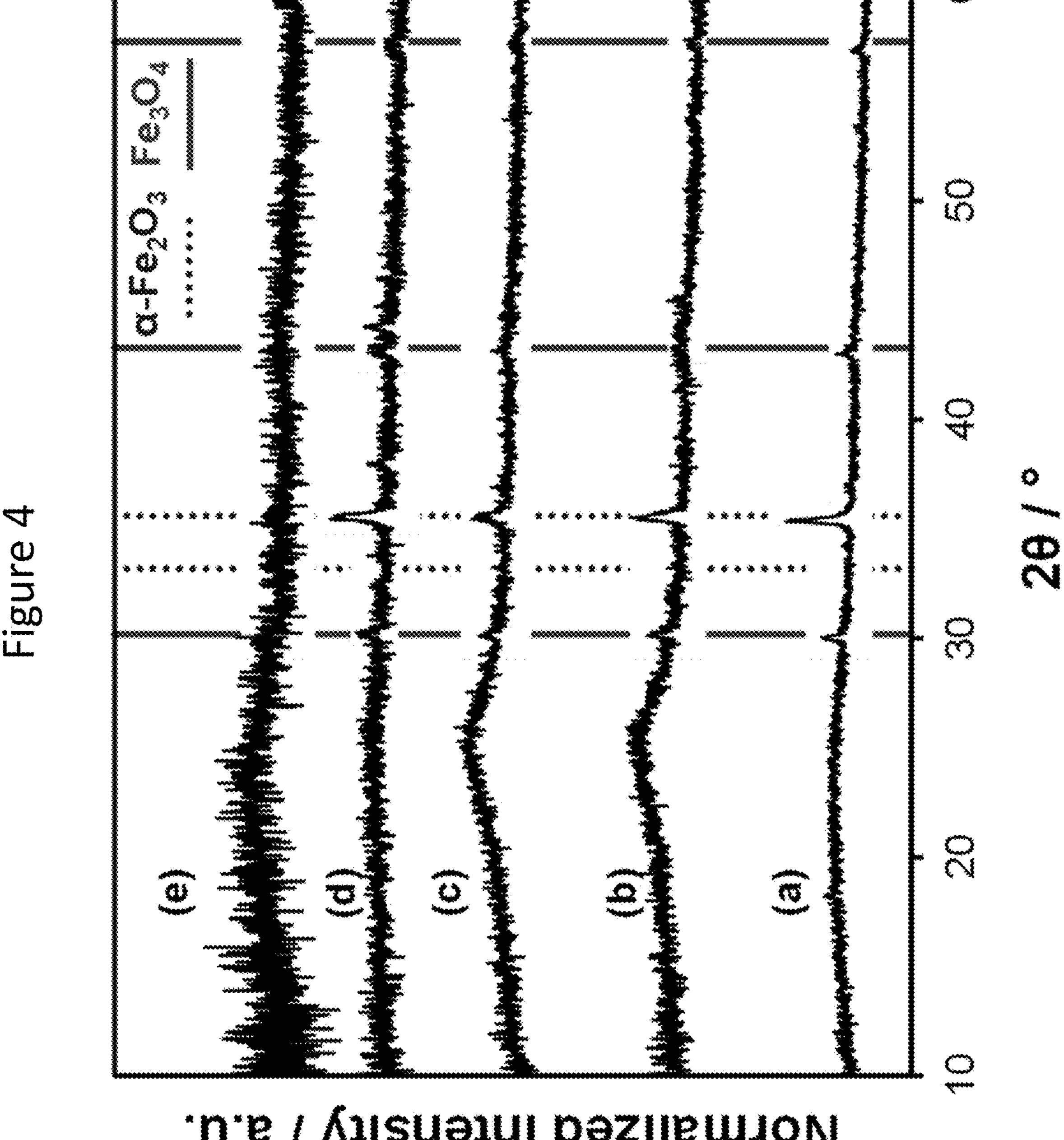
FIG. 4 shows powder X-Ray diffraction patterns of Fe—N—C catalysts prepared by metalation procedures normalized to their maximum intensity and offset by multiples of 1.1 units for clarity. Patterns correspond to 6.9Fe-ZIF-8-C [$Fe(OAc)_2$] (a), 3.5Fe-PANI-C[$Fe(OAc)_2$] (b), 4.9Fe-PANI-C[$Fe(OAc)_3$] (c), 8.4Fe-ZIF-8-C[$Fe(OAc)_2$] (d), and 1.3Fe-ZIF-8-C[$FeCl_2$] (e).
Figure 5A:
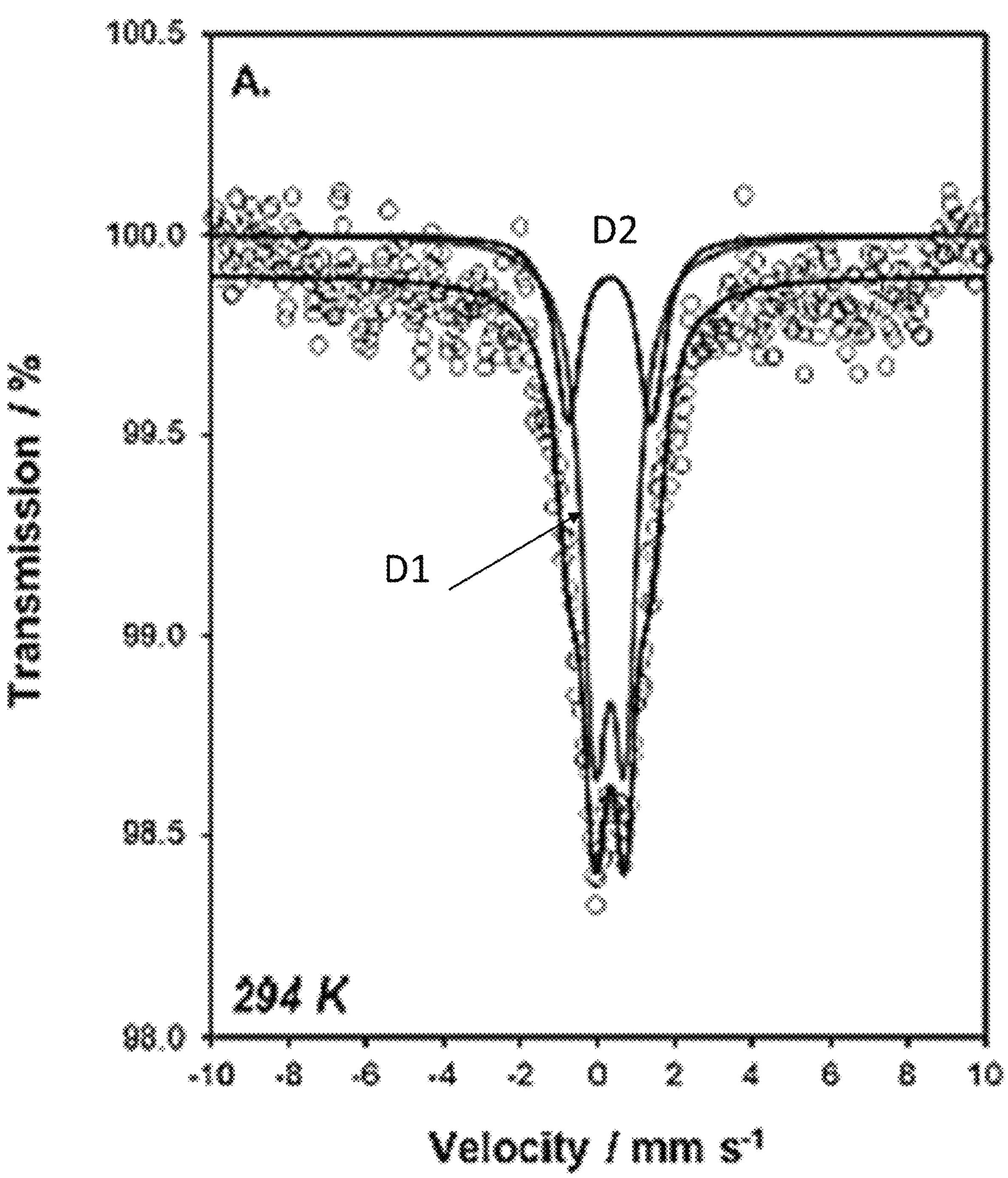
FIG. 5A shows $^{57}$Fe Mossbauer spectrum of 1.3Fe-ZIF-8-C[$FeCl_2$] collected at 294 K. Open symbols correspond to measured data, and solid black lines correspond to the sum of individual components fit to the data in colored lines, with fitting parameters given in the table beside the spectrum.
Figure 5B:
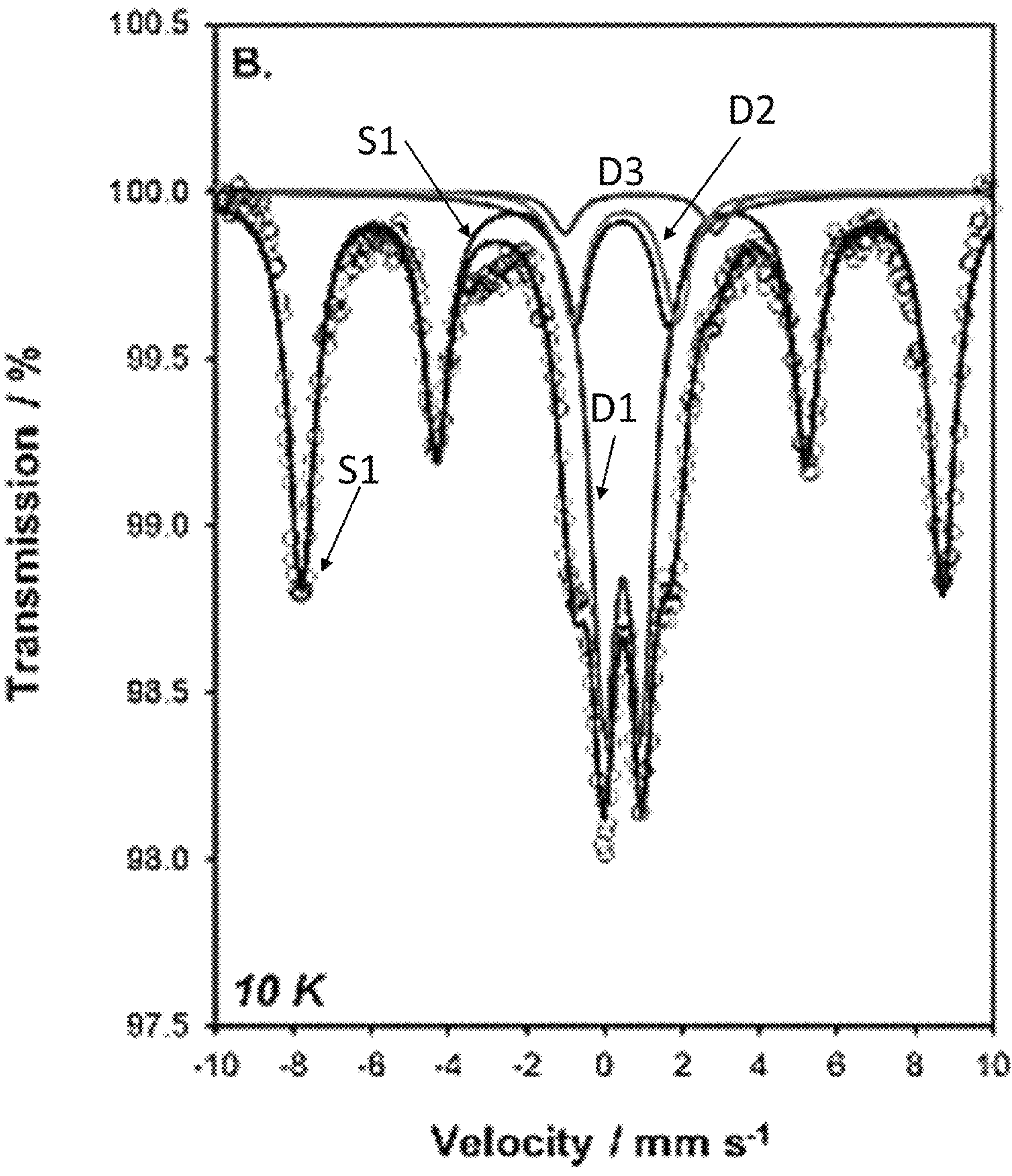
FIG. 5B shows $^{57}$Fe Mossbauer spectrum of 1.3Fe-ZIF-8-C[$FeCl_2$] collected at 10 K. Open symbols correspond to measured data, and solid black lines correspond to the sum of individual components fit to the data in colored lines, with fitting parameters given in the table beside the spectrum.

As with Co-based materials, one-step pyrolysis methods using 1,10-phenanthroline and polyaniline result in low site utilization, as indicated by nominal TOFs that fall well below $1.8\ s^{-1}$ at total Fe loadings >1 wt % (FIG. 3C). Molecularly-inspired metalation methods using $FeCl_2$ or $Fe(OAc)_2$ lead to Fe—N—C materials with similar or better $FeN_4$ loadings than PAJ Fe—N—C or other one-step pyrolysis materials, but unfortunately lead to concomitant formation of $FeO_x$ moieties that lead to nominal TOF values of at most $0.15\ s^{-1}$. Such $FeO_x$ moieties are detectable by XRD when their aggregate sizes are sufficiently large (>~3 nm) in samples that contain 3.5-8.4 wt % Fe (FIG. 4), but are not XRD-visible in the material metalated with $FeCl_2$. Mossbauer spectra collected at 10 K (FIGS. 5A and 5B), however, show a strong sextet feature that corresponds to magnetic $FeO_x$ nanoparticles and represents 74% of the total area, which is semi-quantitative at lower temperatures.[14] Improved methodologies that mitigate $FeO_x$ formation are currently under investigation.

Figures 5B, 6A:
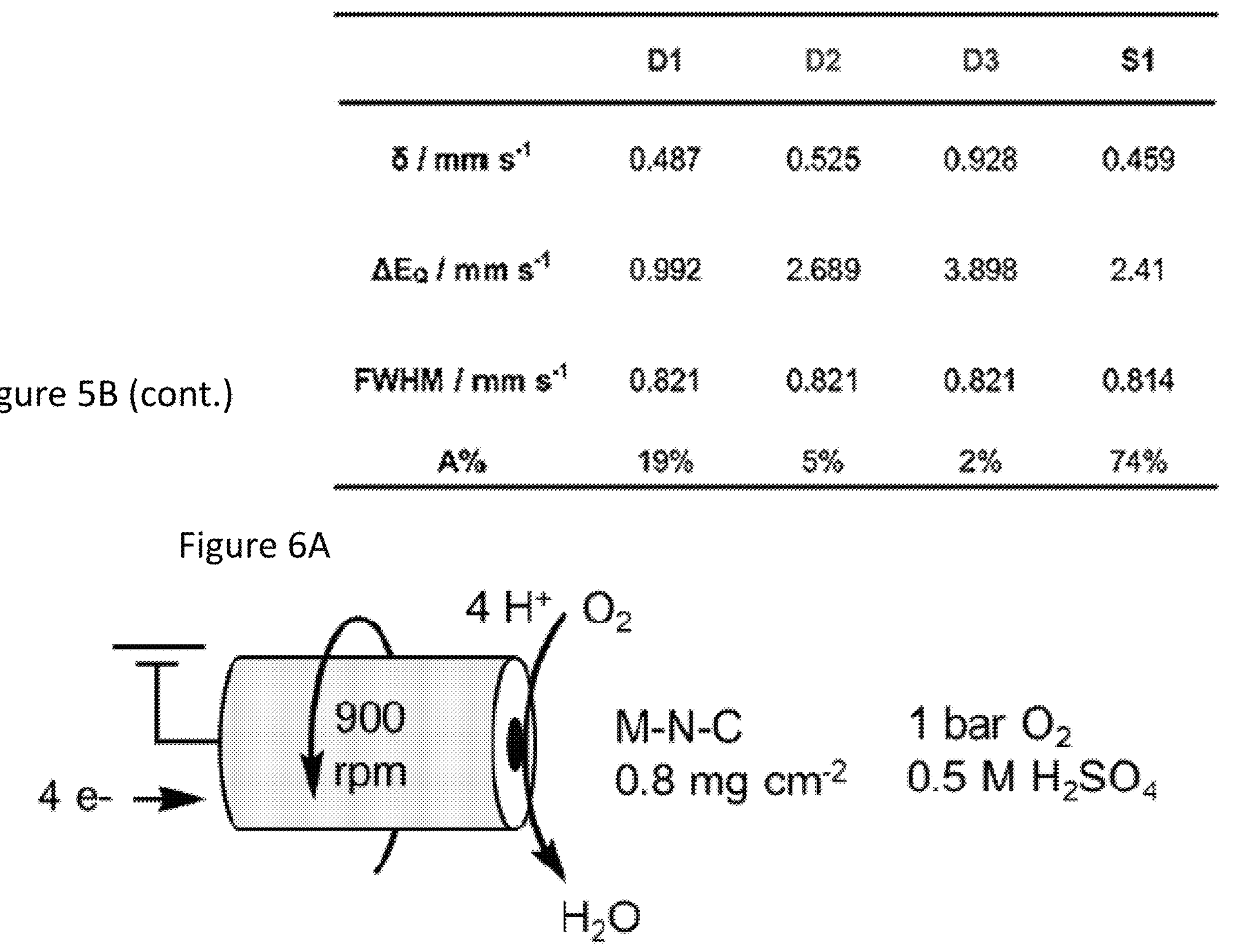
FIG. 6A illustrates the setup for ORR (oxygen reduction reaction) benchmarking of metalated Fe—N—C and Co—N—C catalysts. Steady-state ORR polarization curves were measured at 0.8 mg $cm^{-2}$ catalyst loading in $O_2$-saturated 0.5 M $H_2SO_4$ by staircase voltammetry (20 mV step, 25 s hold) at 900 rpm.
Figure 6B:
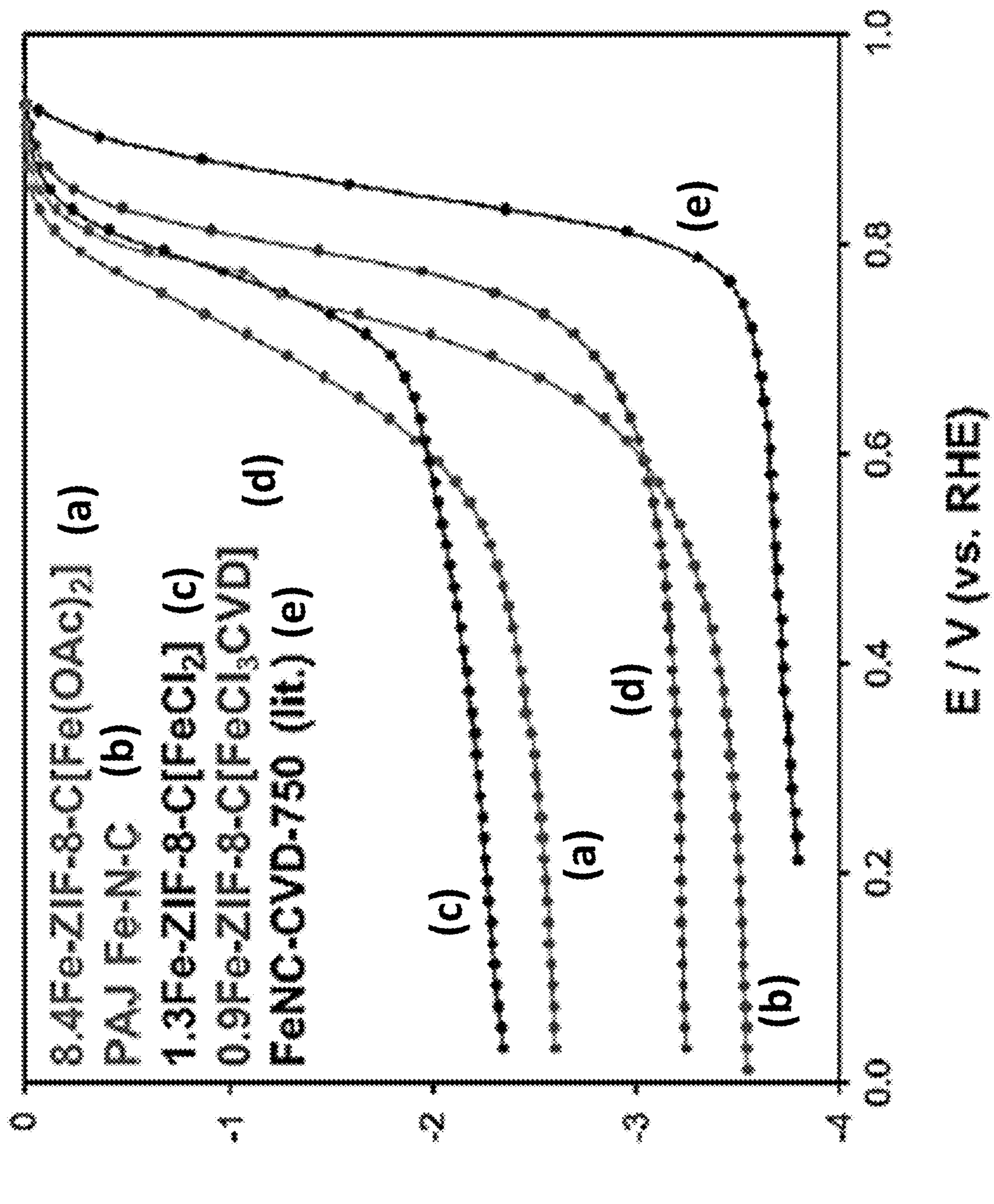
FIG. 6B shows ORR polarization curves collected using the setup shown in FIG. 6A, comparing metalated Fe—N—C catalysts with CVD-metalated Fe—N—C[7]. PAJ Fe—N—C was measured at 0.6 mg $cm^{-2}$.
Figure 6C:
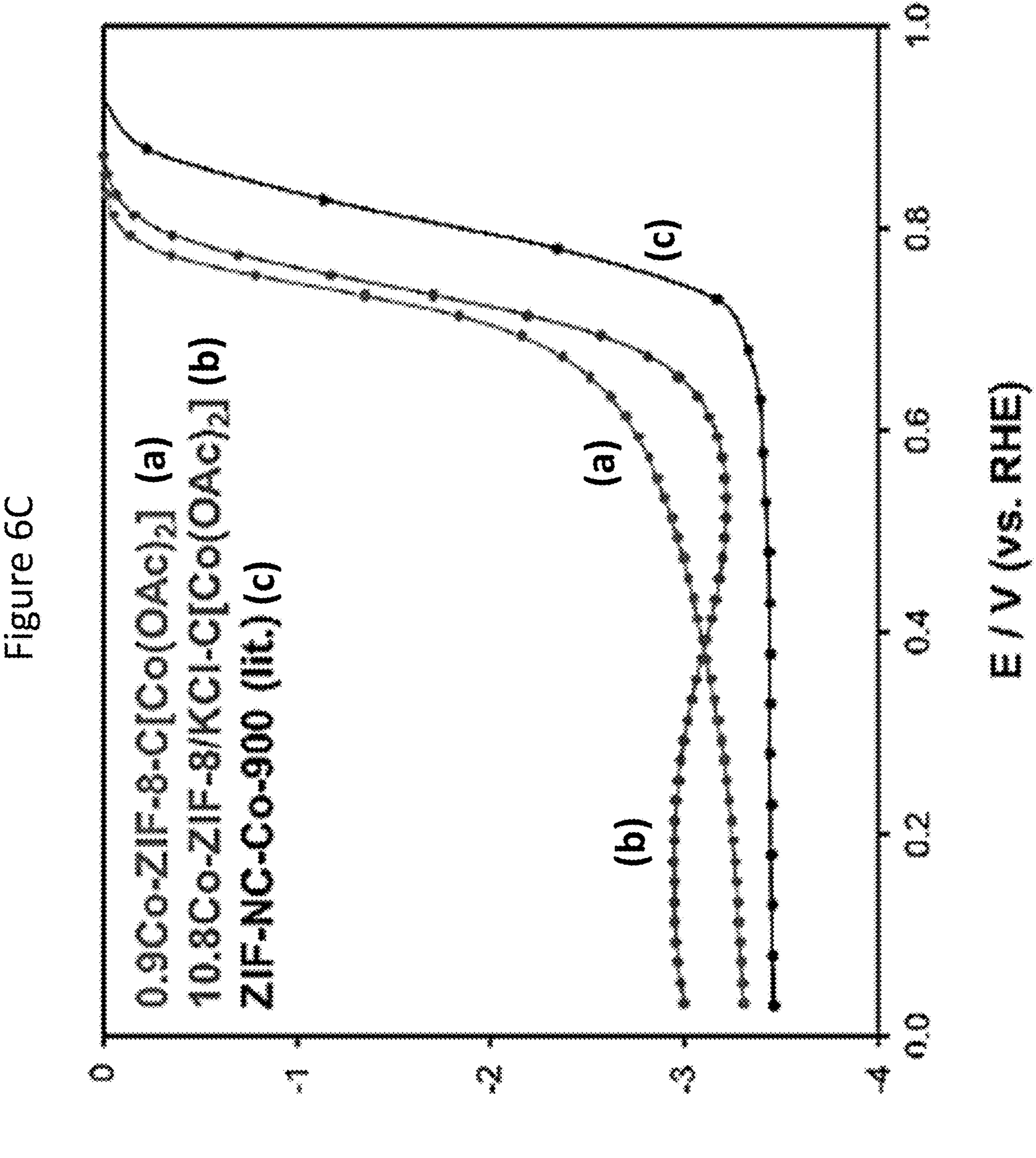
FIG. 6C shows ORR polarization curves collected using the setup shown in FIG. 6A, comparing metalated Co—N—C catalysts with thermally activated $Co(NO_3)_2$-adsorbed N—C[12].

Whereas hydroquinone oxidation serves as a quantitative probe of active site speciation, the electrocatalytic $O_2$ reduction reaction (ORR) was pursued as a complementary reaction of practical interest. The extensive ORR literature also provides examples of the state-of-the-art[15] in Fe—N—C[7] and Co—N—C[12] catalysts for benchmarking. Metalated Fe—N—C and Co—N—C are competent ORR catalysts (FIGS. 6A, 6B and 6C), providing a further validation that they possess atomically dispersed active sites resulting from the metalation process. Nevertheless, their ORR reactivity lags behind those of state-of-the-art catalysts, indicating that further optimizations to the N—C support structure and metalation conditions are required to fully realize the potential of this methodology.

REFERENCES CITED (1) Jaouen, F.; Proietti, E.; Lefèvre, M.; Chenitz, R.; Dodelet, J.-P.; Wu, G.; Taek Chung, H.; Marie Johnston, C.; Zelenay, P. Recent Advances in Non-Precious Metal Catalysis for Oxygen-Reduction Reaction in Polymer Electrolyte Fuel Cells. *Energy Environ. Sci.* 2011, 4, 114-130.

(2) Franco, F.; Rettenmaier, C.; Jeon, H. S.; Cuenya, B. R. Transition Metal-Based Catalysts for the Electrochemical $CO_2$ Reduction: From Atoms and Molecules to Nanostructured Materials. *Chem. Soc. Rev.* 2020, 49, 6884-6946.

(3) Jagadeesh, R. V.; Junge, H.; Pohl, M.-M.; Radnik, J.; Bruckner, A.; Beller, M. Selective Oxidation of Alcohols to Esters Using Heterogeneous $Co_3O_4$—N@C Catalysts under Mild Conditions. *J. Am. Chem. Soc.* 2013, 135, 10776-10782.

(4) Jagadeesh, R. V.; Junge, H.; Beller, M. Green Synthesis of Nitriles Using Non-Noble Metal Oxides-Based Nanocatalysts. *Nat. Commun.* 2014, 5, 4123.

(5) Li, J.; Jiao, L.; Wegener, E.; Richard, L. L.; Liu, E.; Zitolo, A.; Sougrati, M. T.; Mukerjee, S.; Zhao, Z.; Huang, Y.; Yang, F.; Zhong, S.; Xu, H.; Kropf, A. J.; Jaouen, F.; Myers, D. J.; Jia, Q. Evolution Pathway from Iron Compounds to $Fe_1$(II)-$N_4$ Sites through Gas-Phase Iron during Pyrolysis. *J. Am. Chem. Soc.* 2020, 142, 1417-1423.

(6) Jaouen, F.; Dodelet, J.-P. Average Turn-over Frequency of 02 Electro-Reduction for Fe/N/C and Co/N/C Catalysts in PEFCs. *Electrochim. Acta* 2007, 52, 5975-5984.

(7) Jiao, L.; Li, J.; Richard, L. L.; Sun, Q.; Stracensky, T.; Liu, E.; Sougrati, M. T.; Zhao, Z.; Yang, F.; Zhong, S.; Xu, H.; Mukerjee, S.; Huang, Y.; Cullen, D. A.; Park, J. H.; Ferrandon, M.; Myers, D. J.; Jaouen, F.; Jia, Q. Chemical Vapour Deposition of Fe—N—C Oxygen Reduction Catalysts with Full Utilization of Dense Fe—$N_4$ Sites. *Nat. Mater.* 2021, 20, 1385-1391.

(8) Adler, A. D.; Longo, F. R.; Kampas, F.; Kim, J. On the Preparation of Metalloporphyrins. *J. Inorg. Nucl. Chem.* 1970, 32 (7), 2443-2445.

(9) Yao, S. A.; Hansen, C. B.; Berry, J. F. A Convenient, High-Yielding, Chromatography-Free Method for the Insertion of Transition Metal Acetates into Porphyrins. *Polyhedron* 2013, 58, 2-6.

(10) Mehmood, A.; Pampel, J.; Ali, G.; Ha, H. Y.; Ruiz-Zepeda, F.; Fellinger, T.-P. Facile Metal Coordination of Active Site Imprinted Nitrogen Doped Carbons for the Conservative Preparation of Non-Noble Metal Oxygen Reduction Electrocatalysts. *Adv. Energy Mater.* 2018, 8, 1701771.

(11) Menga, D.; Ruiz-Zepeda, F.; Moriau, L.; Šala, M.; Wagner, F.; Koyutürk, B.; Bele, M.; Petek, U.; Hodnik, N.; Gaberšček, M.; et al. Active-Site Imprinting: Preparation of Fe—N—C Catalysts from Zinc Ion-Templated Ionothermal Nitrogen-Doped Carbons. *Adv. Energy Mater.* 2019, 9, 1902412.

(12) He, Y.; Shi, Q.; Shan, W.; Li, X.; Kropf, A. J.; Wegener, E. C.; Wright, J.; Karakalos, S.; Su, D.; Cullen, D. A.; Wang, G.; Myers, D. J.; Wu, G. Dynamically Unveiling Metal-Nitrogen Coordination during Thermal Activation to Design High-Efficient Atomically Dispersed $CoN_4$ Active Sites. *Angew. Chem., Int. Ed.* 2021, 60, 9516-9526.

(13) Primbs, M.; Sun, Y.; Roy, A.; Malko, D.; Mehmood, A.; Sougrati, M.-T.; Blanchard, P.-Y.; Granozzi, G.; Kosmala, T.; Daniel, G.; Atanassov, P.; Sharman, J.; Durante, C.; Kucernak, A.; Jones, D.; Jaouen, F.; Strasser, P. Establishing Reactivity Descriptors for Platinum Group Metal (PGM)-Free Fe—N—C Catalysts for PEM Fuel Cells. *Energy Environ. Sci.* 2020, 13, 2480-2500.

(14) Sougrati, M. T.; Goellner, V.; Schuppert, A. K.; Stievano, L.; Jaouen, F. Probing Active Sites in Iron-Based Catalysts for Oxygen Electro-Reduction: A Temperature-Dependent $^{57}$Fe Mössbauer Spectroscopy Study. *Catal. Today* 2016, 262, 110-120.

(15) Specchia, S.; Atanassov, P.; Zagal, J. H. Mapping Transition Metal-Nitrogen-Carbon Catalyst Performance on the Critical Descriptor Diagram. *Curr. Opin. Electrochem.* 2021, 27, 100687.

Materials and Methods

1. General Considerations

All commercially available compounds and solvents were purchased from Sigma-Aldrich and used as received, unless otherwise noted.

A commercially available Fe—N—C catalyst was sourced from Pajarito Powder[1] (product number PMF-011904), and is referred to as "PAJ Fe—N—C."

$^{1}$H NMR spectra were recorded on a Bruker Avance III 400 MHz spectrometer. Multiplicities are described by using the following abbreviations: m=multiplet.

High-temperature pyrolysis treatments were performed using a tube furnace in horizontal orientation (Nabertherm R 50/500/13) under flowing $N_2$. The catalyst was placed in a quartz boat in the center of a quartz tube, which was placed inside the tube furnace. The quartz tube was flushed with flowing $N_2$ (liquid $N_2$ boiloff) for 0.5 h. The tube furnace was then heated to the desired temperature at a ramp rate of 5° C. $min^{-1}$ and held at that temperature for a specified time under flowing $N_2$, then cooled by convection to ambient temperature.

Inductively coupled plasma optical emission spectroscopy (ICP-OES) analysis was performed on an Agilent 5110 VDV instrument. Co, Fe, and Zn concentrations were quantified using calibrations developed by diluting commercial standards of Co, Fe, and Zn metals (1000 mg $L^{-1}$ in 2% nitric acid, Sigma-Aldrich). Samples were digested for analysis by a reported procedure[2]: 5-10 mg of M-N—C were weighed into 4 $cm^3$ borosilicate glass vials, mixed with 1 $cm^3$ of 70% $HNO_3$, then loosely capped and heated to 100° C. in an aluminum block for 1 h. The resulting slurry was diluted into a known mass of $H_2O$ (18.2 M Ω cm, ~35 g) and filtered (0.45 μm PTFE) prior to analysis.

2. Catalyst Synthesis

TABLE 1

Summary of Co—N—C materials investigated in this example.

| Co—N—C catalyst[a,b] | Co wt %[c] | Synthesis Method |
|---|---|---|
| 0.3Co-Phen-C | 0.3 | one-step pyrolysis |
| 0.4Co-Phen-C | 0.4 | one-step pyrolysis |
| 0.8Co-Phen-C | 0.8 | one-step pyrolysis |
| 1.4Co-Phen-C | 1.4 | one-step pyrolysis + acid wash |
| 1.8Co-Phen-C | 1.8 | one-step pyrolysis |
| 2.1Co-Phen-C | 2.1 | one-step pyrolysis |
| 0.2Co-PANI-C | 0.2 | one-step pyrolysis + acid wash |
| 3.7Co-PANI-C | 3.7 | one-step pyrolysis + acid wash |
| 4.1Co-PANI-C | 4.1 | one-step pyrolysis |
| 10.5Co-ZIF-8-C | 10.5 | one-step pyrolysis |
| 0.8Co-ZIF-8-C[$CoCl_2$] | 0.8 | $CoCl_2$ metalation in DMF |
| 0.9Co-ZIF-8/Phen-C[$CoCl_2$] | 0.9 | $CoCl_2$ metalation in DMF |
| 0.8Co-ZIF-8-C[$Co(OAc)_2$] | 0.8 | $Co(OAc)_2$ metalation in DMF/PhCl |
| 0.9Co-ZIF-8-C[$Co(OAc)_2$] | 0.9 | $Co(OAc)_2$ metalation in DMF/PhCl |
| 10.8Co-ZIF-8/KCl—C[$Co(OAc)_2$] | 10.8 | $Co(OAc)_2$ metalation in DMF/PhCl |

[a]Naming convention for one-step pyrolysis: "nCo—N source-C" where n is the Co wt % (ICP-OES).
[b]Naming convention for metalated materials: "nCo-support[precursor]" where n is the Co wt % (ICP-OES).
[c]Quantified by ICP-OES

TABLE 2

Summary of Fe—N—C materials investigated in this example.

| Fe—N—C catalyst[a,b] | Fe wt %[c] | Synthesis Method |
|---|---|---|
| PAJ Fe—N—C | 0.6 | commercial |
| 1.2Fe-PANI-C | 1.2 | one-step pyrolysis + acid wash |
| 1.5Fe-Phen-C | 1.5 | one-step pyrolysis |
| 1.3Fe-ZIF-8-C[$FeCl_2$] | 1.3 | $FeCl_2$ metalation in DMF |
| 0.3Fe-ZIF-8-Phen-HCl—C[$FeCl_2$] | 0.3 | $FeCl_2$ metalation in DMF |
| 3.5Fe-PANI-C[$Fe(OAc)_2$] | 3.5 | $Fe(OAc)_2$ metalation in DMF/PhCl |
| 4.9Fe-PANI-C[$Fe(OAc)_3$] | 4.9 | $Fe(OAc)_3$ metalation in DMF/PhCl |
| 6.9Fe-ZIF-8-C[$Fe(OAc)_2$] | 6.9 | $Fe(OAc)_2$ metalation in DMF/PhCl |
| 8.4Fe-ZIF-8-C[$Fe(OAc)_2$] | 8.4 | $Fe(OAc)_2$ metalation in DMF/PhCl |
| 0.9Fe-ZIF-8-C[$FeCl_3$CVD] | 0.9 | gas-phase CVD[d] metalation |

[a]Naming convention for one-step pyrolysis: "nFe—N source-C" where n is the Fe wt % (ICP-OES).
[b]Naming convention for metalated materials: "nFe-support[precursor]" where n is the Fe wt % (ICP-OES).
[c]Quantified by ICP-OES.
[d]CVD = chemical vapor deposition.

Synthesis of M-Phen-C(M=Co, Fe): A representative procedure (based on the literature[3]) is described below and corresponds to 2.1Co-Phen-C(Table 1). $Co(OAc)_2.4H_2O$ (0.518 g, 2 mmol) and 1,10-phenanothroline monohydrate (1.223 g, 6.1 mmol, 3:1 Phen:Co ratio) were dissolved in ethanol (184 mL) in a 250 mL round-bottomed flask. Ketjenblack EC-300J (4 g) was added, then the flask was capped with a rubber septum and the mixture was stirred at 60° C. for 4 h. Then the flask was uncapped and the mixture was allowed to cool. The ethanol was allowed to evaporate under a low air flow at ambient temperature overnight. The resulting brittle powder was ground in an agate mortar and pestle. A 1.2 g portion of this powder was loaded into two quartz boats and treated within a horizontal tube furnace in flowing $N_2$ (150 $cm^3$ $min^{-1}$) at 800° C. (ramp rate=10° C. $min^{-1}$) for 2 h, then cooled by convection to ambient temperature. After this treatment, 0.95 g of Co-Phen-C were recovered. Additional samples with different Co loadings were synthesized by similar procedures but with systematically varying Co and Phen amounts (3:1 Phen:Co kept constant). Fe-Phen-C was synthesized similarly but with $Fe(OAc)_2$ as the Fe source.

1.4Co-Phen-C was obtained by stirring 0.56 g of 2.1Co-Phen-C in 26 mL of 0.5 M $H_2SO_4$ at 80° C. for 21 h, washing with $H_2O$ in a disposable filter funnel with a 10 μm polyethylene frit until the pH of the filtrate was ~7. The solids were dried overnight in a 70° C. oven and then loaded into a small quartz boat and placed in the center of a quartz tube in horizontal orientation within a tube furnace. The system was purged with flowing Na (530 $cm^3$ $min^{-1}$) and then heated to 800° C. (10° C. min') for 2 h, and allowed to convectively cool to ambient temperature.

Synthesis of M-PANI-C(M=Co, Fe): A representative procedure (based on the literature[4,5]) is described below and corresponds to 1.2Fe-PANI-C(Table 2). $FeCl_3.6H_2O$ (0.46 g, 1.7 mmol), acid-washed Ketjenblack EC-300J (0.5 g, Fuel Cell Store), and 0.5 M HCl (24.4 mL) were stirred in a perfluoroalkoxyalkane container (Savillex Corp.) with a Teflon stir bar. Aniline (2.4 mL, 27 mmol) was stirred into the mixture, which was cooled in an ice bath to <10° C. In a separate vial, $(NH_4)_2S_2O_8$ (APS, 6.27 g, 1 eq. relative to aniline) was dissolved in 14.9 mL of 0.5 M HCl. The APS solution was added slowly dropwise while monitoring the temperature. One brief excursion to 30° C. was observed, where otherwise the temperature stayed below 10° C. The mixture was stirred overnight at ambient temperature, and then heated to 80° C. under a low Na flow until dry. The dried mixture was crushed with a mortar and pestle, then treated in a horizontal tube furnace in flowing $N_2$ (~1500 $cm^3$ $min^{-1}$) at 900° C. (ramp rate=5° C. $min^{-1}$) for 1 h, then cooled by convection to ambient temperature. A portion of the heat-treated sample (2 g) was then treated in 0.5 M $H_2SO_4$ (50 mL) at 80° C. for 8 h to with the intent to remove unstable and inactive species from the catalyst, washed with $H_2O$ until the pH of the filtrate was ~7 (~350 mL of $H_2O$), then dried overnight in a vacuum oven at 50° C. Finally, a second heat treatment in flowing $N_2$ (~500 $cm^3$ $min^{-1}$) at 900° C. (ramp rate=5° C. $min^{-1}$) for 3 h was performed, then cooled by convection to ambient temperature. Co-PANI-C and PANI-C were synthesized by similar procedures, using $Co(NO_3)_2.6H_2O$, and no metal source, respectively.

Synthesis of ZIF-8: ZIF-8 was synthesized according to a reported procedure.[6] In a 2 L pyrex beaker with a Teflon stir bar, $Zn(NO_3)_2.6H_2O$ (15.5 g, 28.5 mmol) was dissolved in 750 $cm^3$ of methanol (Avantor, anhydrous). In a separate 1 L pyrex beaker, 2-methylimidazole (mIm, 9.95 g, 67 mmol) was dissolved in 750 $cm^3$ of methanol. The mIm solution was slowly poured into the $Zn(NO_3)_2$ solution while stirring. After addition was complete, the beaker was covered in aluminum foil and the solution was stirred vigorously (~1000 rpm) overnight at ambient temperature. The white solid product was recovered from the reaction mixture by centrifugation, washed three times with methanol, then dried overnight in a 70° C. oven. Typically, 1.4-1.5 g of ZIF-8 are recovered after drying, which corresponds to a ~11% yield based on Zn.

Synthesis of ZIF-8-C: ZIF-8 (0.5-1.5 g) was loaded into a quartz boat and placed in the center of a quartz tube in horizontal orientation within a tube furnace. The system was purged with flowing Na (>300 $cm^3$ $g^{-1}$ $min^{-1}$) for 0.5 h, then heated to 1050° C. (5° C. $min^{-1}$) for 1 h, and allowed to convectively cool to ambient temperature. Metallic Zn was observed at the outlet of the tube furnace after this procedure. The recovered black powder (ZIF-8-C) was typically 25-35% of the mass of ZIF-8 loaded into the furnace (variations occur because of sample losses due to static).

Synthesis of ZIF-8/Phen-C: ZIF-8 impregnated with 1,10-phenanthroline was pyrolyzed according to a reported procedure.[7] ZIF-8 (0.70 g) and 1,10-phenanthroline (0.18 g) were weighed into a perfluoroalkoxyalkane container (Savillex Corp.) with a Teflon stir bar, then $H_2O$ (21.2 g, 18.2 M Ω cm) and ethanol (33.5 g, Decon labs, 200 proof) were added. The mixture was covered and stirred at 500 rpm for 2 h. The mixture was then dried for 24 h at 80° C. in a vacuum oven. The recovered solids (811 mg) were loaded into a small quartz boat and placed in the center of a quartz tube in horizontal orientation within a tube furnace. The system was purged with flowing Na (700 $cm^3$ $min^{-1}$) and then heated to 1050° C. (5° C. $min^{-1}$) for 1 h, and allowed to convectively cool to ambient temperature.

Synthesis of ZIF-8-Phen-C—HCl: ZIF-8-Phen-C(995 mg) was loaded into a quartz boat within the center of a quartz tube sealed with Teflon-capped inlet and outlet ports. The quartz tube inlet was connected with tygon tubing to the outlet of a three neck round-bottom flask. The round-bottom flask was charged with 35 g (0.60 mol) NaCl and a stir bar. An addition funnel was connected to the round-bottom flask and was charged with 35 mL (0.64 mol) concentrated $H_2SO_4$. The system was purged with flowing of Na (600 $cm^3$ $min^{-1}$), and the outlet of the quartz tube was bubbled through a $NaHCO_3$ solution before venting into a fume hood. After purging the system with $N_2$ for 30 minutes, the furnace was heated to 750° C. (10° C. $min^{-1}$) and held for 1 hour. When the temperature reached 750° C., $H_2SO_4$ was added to NaCl dropwise with stirring and the generated HCl vapor was passed over the solid with the $N_2$ flow for 1 hour. After the addition of $H_2SO_4$ to the NaCl flask was complete, the sample was held at 750° C. for an additional 20 minutes then allowed to convectively cool to ambient temperature. 935 mg of solid was recovered, and is denoted ZIF-8-Phen-C—HCl.

Synthesis of ZIF-8/KCl—C: ZIF-8 was intercalated within KCl and pyrolyzed according to a reported procedure.[8] KCl (15 g) was dissolved in 60.3 g of $H_2O$ (18.2 M Ω cm) in a 120 mL beaker with a Teflon stir bar, then ZIF-8 (0.75 g) was added. Aliquots of methanol were added to the mixture until the hydrophobic ZIF-8 formed a well-mixed dispersion, which was allowed to homogenize (stirring at 500 rpm) for 0.5 h. The stagnant mixture was then dried by heating to 120° C. in an oil bath under a low Na flow overnight. The recovered solids (15.48 g) were ground in an agate mortar and pestle, loaded into a large quartz boat, and placed in the center of a quartz tube in horizontal orientation within a tube furnace. The system was purged with flowing Na ($1100\ cm^3\ min^{-1}$) for 0.5 h and then heated to 700° C. (2° C. $min^{-1}$) for 5 h, and allowed to convectively cool to ambient temperature.

The resulting black-and-white solid product was recovered (14.425 g) and transferred to a 120 mL perfluoroalkoxyalkane container (Savillex Corp.) with a Teflon stir bar. 80 mL of 2M HCl were added and the mixture was stirred (200 rpm) for 1 h with the intent to dissolve KCl. The black solid product was recovered by filtration on a disposable filter funnel with a 10 μm polyethylene frit and washed with ~80 mL $H_2O$ (18.2 M Ω cm) four times until the pH was ~5-6. The product was finally washed with ~100 mL of ethanol (Decon labs, 200 proof), then dried overnight in a 70° C. oven. A flaky black powder (134 mg, denoted ZIF-8/KCl—C) was recovered and represents ~18% of the initial mass of ZIF-8 used.

Synthesis of M-ZIF-8-C[$MCl_2$] (M=Co, Fe) by metalation: The following procedure corresponds to 0.8Co-ZIF-8-C[$CoCl_2$] in Table 1. ZIF-8-C(200 mg) and $CoCl_2$ (123 mg) were weighed into a 25 mL Schlenk tube with an egg-shaped Teflon stir bar and degassed under dynamic vacuum at ambient temperature for 1 h. Simultaneously, 5 mL of dimethylformamide (DMF) and 0.5 mL of tributylamine ($Bu_3N$, 2 eq. relative to Co) were added to another round-bottomed Schlenk flask and purified by three freeze-pump-thaw cycles. Both flasks were held under Na pressure and the liquids were transferred by cannula to the Schlenk tube containing the solids to give a 0.17 M solution of $CoCl_2$. Under Na pressure, the Schlenk tube was equipped with a reflux condenser and heated to 150° C. while stirring at 600 rpm. After 20 h, the mixture was allowed to cool for 1 h and the solids were recovered by filtration on a disposable filter funnel with a 10 μm polyethylene frit. The solids were washed with ~50 mL of DMF three times, once with 50 mL of acetic acid, and three times with ~30 mL of methanol, then dried overnight at 80° C. in a vacuum oven.

The recovered solids were loaded into a small quartz boat and placed in the center of a quartz tube in horizontal orientation within a tube furnace. The system was purged with flowing Na (>$300\ cm^3\ min^{-1}$) and heated to 600° C. (5° C. $min^{-1}$) for 2 h, and allowed to convectively cool to ambient temperature. Co-ZIF-8/Phen-C[$CoCl_2$] was prepared by a similar procedure, using ZIF-8/Phen-C as the solid support. Fe-ZIF-8-C[$FeCl_2$] was prepared by a similar procedure, using 400 mg of ZIF-8-C, 130 mg of $FeCl_2$ (stored in a $N_2$-filled glovebox), 10 mL of DMF, and 0.5 mL of $Bu_3N$ (2 eq. relative to $FeCl_2$).

Synthesis of Co-ZIF-8-C[$Co(OAc)_2$] by metalation: The following procedure corresponds to 0.8Co-ZIF-8-C[$Co(OAc)_2$] in Table 1. ZIF-8-C(207 mg), $Co(OAc)_2.4H_2O$ (203 mg), and sodium acetate (99.3%, Fisher, 171 mg, 2.6 eq. relative to Co) were weighed into a 250 mL round-bottomed flask with an egg-shaped Teflon stir bar. A 3:2 chlorobenzene:DMF solvent was added (100 mL), and the flask was topped with a small Soxhlet extractor. The Soxhlet extractor contained a cellulose thimble filled with $K_2CO_3$ (1.5 g, 13.6 eq. relative to Co) topped with glass wool to hold it in place. The top of the Soxhlet extractor was connected to a reflux condenser. The mixture was stirred at 400 rpm and heated in an oil bath until reflux was established in the Soxhlet extractor ($T_{bath}$=160-170° C.), and allowed to reflux overnight (>20 h).

The mixture was allowed to cool for 1 h and the solids were recovered by filtration on a disposable filter funnel with a 10 μm polyethylene frit. The solids were washed with ~50 mL of $H_2O$ (18.2 M Ω cm) six times, once with ~50 mL of methanol, and once more with $H_2O$, then dried overnight at 50° C. in a vacuum oven. The recovered solids were loaded into a large quartz boat and placed in the center of a quartz tube in horizontal orientation within a tube furnace. The system was purged with flowing $N_2$ ($600\ cm^3\ min^{-1}$) for 0.5 h, then heated to 600° C. (5° C. $min^{-1}$) for 2 h, and allowed to convectively cool to ambient temperature. The other two Co-Support-[$Co(OAc)_2$] samples in Table S1 were made by similar methods at lower scale (100 mg of support). 10.8Co-ZIF-8/KCl—C[$Co(OAc)_2$] was also washed differently: ~60 mL DMF twice, ~30 mL methanol, then ~60 mL $H_2O$ (18.2 MΩ cm) twice.

Synthesis of Fe-Support[$FeCl_2$] by metalation: The following procedure corresponds to 0.3Fe-ZIF-8-Phen-HCl—C[$FeCl_2$] in Table 2. $Bu_3N$ and DMF were dried over $CaH_2$ and transferred to flame-dried vessels sealed by Teflon stoppers, then degassed by three freeze-pump-thaw cycles, and transferred to a glovebox for storage. In the glovebox, an oven-dried glass pressure tube was charged with 300 mg of ZIF-8-Phen-C—HCl, 11.9 mg (0.0939 mmol) $FeCl_2$, 1.3 mL (5.42 mmol) $Bu_3N$ and 20 mL DMF. The pressure tube was sealed with a Teflon stopper equipped with a silicone o-ring and taken out of the glovebox. The reaction mixture was stirred at 150° C. for 20 hours then it was allowed to cool to ambient temperature. The solids were recovered under air by filtration on a disposable filter funnel with a 10 μm polyethylene frit. The solids were washed with ~70 mL of DMF, 50 mL of glacial acetic acid, and ~70 mL of methanol, then dried overnight at 75° C. in an oven. The solids recovered (277 mg) are denoted 0.3Fe-ZIF-8-Phen-C—HCl[$FeCl_2$].

Synthesis of Fe-Support[$Fe(OAc)_{2(or\ 3)}$] by metalation: The following procedure corresponds to 6.9Fe-ZIF-8-C[$Fe(OAc)_2$] in Table 2. ZIF-8-C(152 mg), $Fe(OAc)_2$ (140 mg), and sodium acetate (99.3%, Fisher, 167 mg, 2.5 eq. relative to Fe) were weighed into a 250 mL round-bottomed flask with an egg-shaped Teflon stir bar. A 3:2 chlorobenzene:DMF solvent was added (75 mL), and the flask was topped with a small Soxhlet extractor. The Soxhlet extractor contained a cellulose thimble filled with $K_2CO_3$ (1.54 g, 13.9 eq. relative to Fe) topped with glass wool to hold it in place. The top of the Soxhlet extractor was connected to a reflux condenser. The mixture was stirred at 300 rpm and heated in an oil bath until reflux was established in the Soxhlet extractor ($T_{bath}$=160-170° C.), and allowed to reflux overnight (>20 h).

The mixture was allowed to cool for 1 h and the solids were recovered by filtration on a disposable filter funnel with a 10 μm polyethylene frit. The solids were washed once with ~100 mL of $H_2O$ (18.2 MΩ cm), once with ~50 mL of methanol, and three more times with ~100 mL $H_2O$, then dried overnight in a 70° C. oven. The recovered solids were loaded into a large quartz boat and placed in the center of a quartz tube in horizontal orientation within a tube furnace. The system was purged with flowing Na ($550\ cm^3\ min^{-1}$) for 0.5 h, then heated to 600° C. (5° C. $min^{-1}$) for 1 h, and allowed to convectively cool to ambient temperature. 3.5Fe-PANI-C[$Fe(OAc)_2$] and 4.9Fe-PANI-C[$Fe(OAc)_3$] were synthesized by similar procedures; in the latter case, [$Fe_3(\mu\text{-}O)(OAc)_6(H_2O)_3$] OAc was prepared according to a reported procedure[9] and used instead of $Fe(OAc)_2$.

8.4Fe-ZIF-8-C[$Fe(OAc)_2$] was made by a similar procedure, but under air-free conditions. A stock of 3:2 chlorobenzene:DMF solution was degassed under dynamic vacuum at reduced temperature and stored in an $N_2$-filled glove box for use in this procedure. A 100 mL round-bottomed flask containing ZIF-8-C(148 mg), $Fe(OAc)_2$ (99 mg), and NaOAc (106 mg) was degassed under dynamic vacuum, sealed, and brought into the $N_2$-filled glovebox along with the Soxhlet extractor containing a $K_2CO_3$ (1 g) thimble, and a rubber septum. In the $N_2$-filled glovebox, 50 mL of the 3:2 chlorobenzene:DMF stock solution were added to the round-bottomed flask, and the flask was topped with the Soxhlet extractor and sealed under positive $N_2$ pressure with a rubber septum at the top of the Soxhlet extractor. The sealed flask was brought out of the glovebox and brought under positive $N_2$ pressure as soon as possible by piercing the rubber septum atop the Soxhlet extractor with a needle attached to a $N_2$-purged line. The mixture was stirred at 300 rpm and heated in an oil bath until reflux was established in the Soxhlet extractor ($T_{bath}$=160-170° C.), and allowed to reflux overnight (>20 h).

The mixture was allowed to cool and the solids were recovered by filtration on a disposable filter funnel with a 10 μm polyethylene frit. The solids were washed twice with ~100 mL of $H_2O$ (18.2 MΩ cm), three times with ~80 mL of methanol, and three more times with ~80 mL $H_2O$, then dried overnight in a 70° C. oven. The recovered solids were loaded into a large quartz boat and placed in the center of a quartz tube in horizontal orientation within a tube furnace. The system was purged with flowing $N_2$ (670 $cm^3$ $min^{-1}$) for 0.5 h, then heated to 600° C. (5° C. $min^{-1}$) for 2 h, and allowed to convectively cool to ambient temperature.

Synthesis of Fe-ZIF-8-C[$FeCl_3$CVD] by gas-phase chemical vapor deposition (CVD) metalation: ZIF-8-C was metalated in the gas phase according to a reported procedure.[6] ZIF-8-C(82 mg) was loaded as a thin bed (6 cm in length) in the back of a large quartz boat (18 cm in length). $FeCl_3$ (82 mg) was loaded in front of the ZIF-8-C in the same boat (2 cm separation). The quartz boat was located in the center of a quartz tube with the ZIF-8-C downstream from the $FeCl_3$, then the tube was purged with $N_2$ (630 $cm^3$ $min^{-1}$) for 0.5 h, and heated to 750° C. (25° C. $min^{-1}$) for 3 h, then cooled convectively to ambient temperature. The carbonaceous material was recovered from the quartz boat and purified by repeatedly passing a magnet over the powder ~0.5 cm above it. The solids that remained after magnetic purification (54 mg) are referred to as Fe-ZIF-8-C [$FeCl_3$CVD].

3. Catalyst Characterization

3.1. ICP-OES Data

TABLE 3

ICP-OES quantification of Zn present in ZIF-8-derived materials.

| M—N—C catalyst | Before Metalation | After Metalation |
|---|---|---|
| 0.8Co-ZIF-8-C[$CoCl_2$] | 1.6 | 0.97 |
| 0.9Co-ZIF-8/Phen-C[$CoCl_2$] | 1.9 | 1.9 |
| 0.8Co-ZIF-8-C[$Co(OAc)_2$] | 2.0 | 1.5 |
| 0.9Co-ZIF-8-C[$Co(OAc)_2$] | n.m.[a] | 1.9 |
| 10.8Co-ZIF-8/KCl—C[$Co(OAc)_2$] | 2.5 | 3.4 |
| 1.3Fe-ZIF-8-C[$FeCl_2$] | 2.0 | 1.4 |
| 6.9Fe-ZIF-8-C[$Fe(OAc)_2$] | 2.0 | 1.7 |
| 8.4Fe-ZIF-8-C[$Fe(OAc)_2$] | n.m.[a] | 1.2 |
| 0.9Fe-ZIF-8-C[$FeCl_3$CVD] | 1.8 | 0.8 |

[a]n.m. = not measured

3.2. Powder X-Ray Diffraction

Powder X-ray diffraction patterns were recorded using the Bruker D8 Advance system equipped with a Cu $K_\alpha$ conventional sealed X-ray tube and a Lynxeye detector at ambient temperature. The detector was operated at 40 kV and 40 mA and scans were measured in the range of 10-60° (and in the case of ZIF-8, 4-40°) with a resolution of 0.02°. The recorded patterns were compared with patterns from the ICSD database.[10]

3.3. Mossbauer Spectroscopy

Mossbauer spectra were collected on a 1024 channel See Co model W304 resonant gamma-ray spectrometer using $^{57}$Co on Rh foil as a gamma-ray source. Isomer shifts were referenced to α-Fe foil at room temperature. Fe—N—C samples were loaded into the sample chamber and spectra were collected under vacuum with a source velocity range of ±4 mm $s^{-1}$. Fe—N—C samples were cooled to 10 K using a Janis model SHI-850 cryostat controlled by a Lakeshore model 336 temperature controller. Spectra were fit with the WMOSS4F software package. Refined parameters for each quadrupole doublet were the isomer shift (δ), the quadrupole splitting ($\Delta E_Q$), and the linewidth, calculated as full-width at half-maximum (FWHM).

4. Hydroquinone Oxidation Initial Rate Measurements

4.1. Experimental Methods

HQ1 was prepared according to our previous publication.[11] In a typical experiment, M-N—C samples (5-20 mg) were combined with 0.5 M $H_2SO_4$ (10-20 mL, prepared using 18.2 MΩ cm $H_2O$) and mixed at $2.3\times10^4$ rpm for >180 s using a stainless-steel dispersing tool (IKA S 18 N-10 G), resulting in aggregates <50 μm. Aliquots (20-750 μL) of this well-mixed dispersion were weighed into disposable thick-walled borosilicate glass tubes (10 mL), and additional 0.5 M $H_2SO_4$ was weighed into each to give a total volume of ~750 μL. The reactor tubes were loaded into a large-capacity orbital mixer (Glas-Col) equipped with an aluminum heating block that covers the base of the tubes (3 cm), an aluminum cooling block located 7.5 cm from the base of the tubes controlled by a recirculating chiller, and a gas manifold sealed above the cooling block by viton o-rings and rubber septa. The heating block and cooling block were set to 30° C. and 10° C., respectively, >0.5 h before loading reactor tubes.

The system was pressurized with $O_2$ (99%, Airgas) to 1.1 bar and pressurized then vented for 10 cycles to displace air, then sealed at 1.1 bar under 02. The assembly was mixed at a rotation rate of 1200 rpm for >300 s before starting the reaction. A 250 μL aliquot of a 0.2 M solution of HQ1 in 0.5 M $H_2SO_4$ was injected via syringe (Hamilton) into each reactor tube through the rubber septa to initiate the reaction. After 0.33 h, the pressure was lowered to 1 bar, and the solutions were withdrawn through the septa into disposable syringes and passed through 0.2 μm PTFE filters to complete the reaction. An aliquot of each product solution (~310 mg) was combined with ~330 mg of a 10-60 mM stock solution of pivalic acid (99%) in D20 (99.9% atom D) as an internal standard and analyzed by $^1$H NMR spectroscopy to quantify quinone products and unreacted hydroquinone. A catalyst-free blank was included in every run and used as the initial time reference. Mass balances were generally calculated to be 100±5%.

4.2. Kinetic Data

As described in the experimental section, kinetic data were quantified by varying the catalyst loading in separate tubes reacted for similar lengths of time. In principle, initial rates measured in this manner should match those measured at varying reaction times with similar catalyst loading. We can show this is the case by considering the mass balance on the hydroquinone reactant:

$$\frac{dN_{H_2Q}}{dt} = -r_{ox}m_{cat} \tag{1}$$

where $N_{H2Q}$ is the moles of hydroquinone, $r_{ox}$ is the mass-specific hydroquinone oxidation reaction rate (mol $g^{-1}$ $s^{-1}$), and moat is the mass of catalyst (g). Dividing both sides of eq 1 by the volume of the reaction solution ($V_{sol}$), and assuming constant volume throughout the experiment (reasonable given no solvent loss):

$$-\frac{d[H_2Q]}{dt} = r_{ox}\frac{m_{cat}}{V_{sol}} \tag{2}$$

Now, separating variables and integrating from t=0 to t, and $[H_2Q]_0$ to $[H_2Q]$ gives:

$$[H_2Q]_0 - [H_2Q] = \frac{m_{cat}}{V_{sol}}\int_0^t r_{ox}dt \tag{3}$$

The assumption underlying initial rate data is that they are measured under differential conditions: i.e., where changes in concentration and all other process variables from t= 0 to t are sufficiently small that the value of $r_{ox}$ over this range is approximately constant. If this assumption holds, then the integral can be simplified:

$$[H_2Q]_0 - [H_2Q] = r_{ox}\left(\frac{m_{cat}}{V_{sol}}t\right) \tag{4}$$

Recognizing that $[Q] - [Q]_0 = [H_2Q]_0 - [H_2Q]$, $$[Q] - [Q]_0 = r_{ox}\left(\frac{m_{cat}}{V_{sol}}t\right) \tag{5}$$

Figure 7:
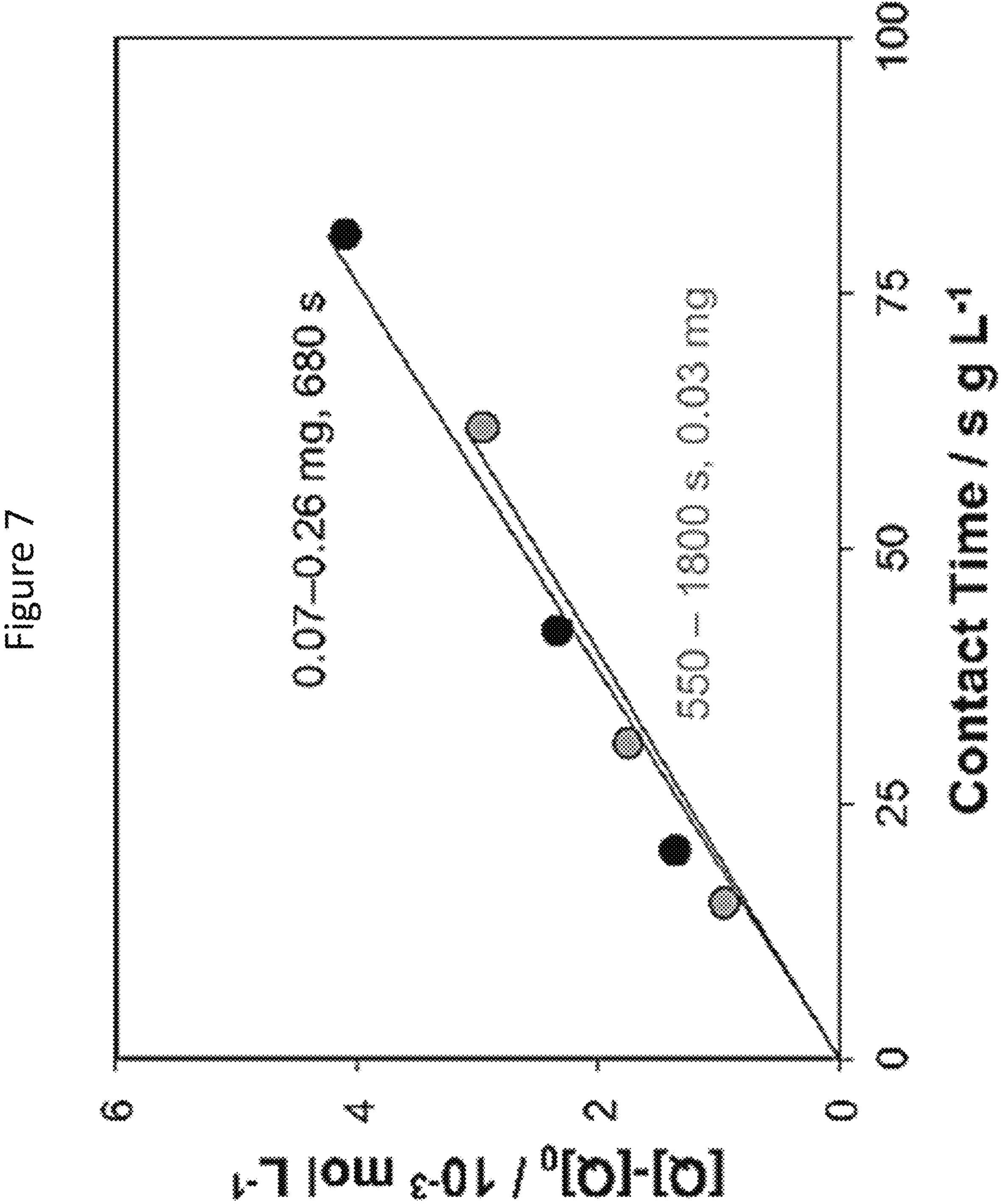
FIG. 7 is a graph showing concentration of quinone formed as a function of contact time on 1.8Co-Phen-C at 30° C., 1.1 bar $O_2$, 0.5 M $H_2SO_4$, $[H_2Q]_0$=50 mM, $[Q]_0$=1 mM.

Here, we refer to the quantity ($m_{cat}$ t $V_{sol}^{-1}$) as the contact time (s g $L^{-1}$).[12] A plot of the quinone formed in batch reactors ($[Q]-[Q]_0$) against the contact time should thus yield a straight line through the origin with a slope that is $r_{ox}$. The kinetic data measured here represent low conversions (<20%) and short reaction times (0.33 h), and thus are in the differential regime that satisfies this requirement. Furthermore, the validity of eq 5 can be checked by verifying that data are the same (within error) when measured by varying either time or catalyst loading, with all other variables held constant. FIG. 7 shows that this is the case for 1.8Co-Phen-C.

5. Electrochemical Kinetic Measurements 5.1. Experimental Methods

Electrocatalytic 02 reduction was measured on M-N—C films deposited on a glassy carbon rotating disk electrode (RDE) with a diameter of 5 mm housed within a cylindrical PTFE shroud (Pine Research Instrumentation, E6R1 ChangeDisk). Catalyst inks composed of 10 mg M-N—C, 36.5 μL of $H_2O$ (18.2 MΩ cm), 300 μL of ethanol, and 108 μL of Nafion solution (5 wt. % in mixture of lower aliphatic alcohols and water, Sigma-Aldrich) were sonicated in an ice-water bath for 1 h. The electrode was polished with a 0.05 μm alumina suspension (BASi) on a polishing pad, then sonicated in methanol for 0.25 h. The electrode was mounted on the rotator in an inverted configuration and rotated at ~100 rpm.

While rotating the electrode, an aliquot of the catalyst ink was deposited on the electrode to achieve a loading of 0.8 mg cm' of catalyst on the electrode, as quantified by the volume of ink dispensed from a volumetric displacement pipet (Eppendorf, 20 μL). The film was allowed to dry at ambient temperature for >0.5 h, then pre-wet with a small drop of electrolyte, and inverted and immersed in the electrolyte (0.5 M $H_2SO_4$ prepared with 18.2 MΩ cm $H_2O$) within a 150 mL glass electrochemical cell (Pine Research Instrumentation, AKCELL3) equipped with a Ag/AgCl reference electrode and graphite rod counter electrode. The electrodes were connected to a potentiostat (BioLogic BP-300), and the cell was sparged with flowing $N_2$ for 0.5 h at open circuit potential.

Potentials were converted to the reversible hydrogen electrode (RHE) scale using the relationship $E_{RHE}$= $E_{Ag/AgCl}$+0.059 pH+0.1976 V, after iR correction was applied during the measurements (typically, 5-10Ω). The catalyst was pretreated under $N_2$ without rotation by undergoing 6 cyclic voltammetry scans from 0.95-0.05 V (vs. RHE) at a scan rate of 10 mV The electrolyte was then sparged with flowing $O_2$ (99%, Airgas) for 0.5 h with the intent to achieve saturation.

The steady-state ORR polarization curve was then collected at 900 rpm using a staircase voltammogram (SV) from 0.95-0.05 V (vs. RHE) with a 20 mV step size and a 25 s potential hold, where the current was averaged over the last 12.5 s of each step.

6. References Cited (Materials and Methods)

(1) https://pajaritopowder.com/pmf-catalysts/(2)

(2) Primbs, M.; Sun, Y.; Roy, A.; Malko, D.; Mehmood, A.; Sougrati, M.-T.; Blanchard, P.-Y.; Granozzi, G.; Kosmala, T.; Daniel, G.; Atanassov, P.; Sharman, J.; Durante, C.; Kucernak, A.; Jones, D.; Jaouen, F.; Strasser, P. Establishing Reactivity Descriptors for Platinum Group Metal (PGM)-Free Fe—N—C Catalysts for PEM Fuel Cells. *Energy Environ. Sci.* 2020, 13, 2480-2500.

(3) Jagadeesh, R. V.; Junge, H.; Pohl, M.-M.; Radnik, J.; Bruckner, A.; Beller, M. Selective Oxidation of Alcohols to Esters Using Heterogeneous $Co_3O_4$—N@C Catalysts under Mild Conditions. *J. Am. Chem. Soc.* 2013, 135, 10776-10782.

(4) Wu, G.; More, K. L.; Johnston, C. M.; Zelenay, P. High-Performance Electrocatalysts for Oxygen Reduction Derived from Polyaniline, Iron, and Cobalt. *Science* 2011, 332, 443-447.

(5) Ferrandon, M.; Wang, X.; Kropf, A. J.; Myers, D. J.; Wu, G.; Johnston, C. M.; Zelenay, P. Stability of Iron Species in Heat-Treated Polyaniline-Iron-Carbon Polymer Electrolyte Fuel Cell Cathode Catalysts. *Electrochim. Acta* 2013, 110, 282-291.

(6) Tang, J.; Salunkhe, R. R.; Liu, J.; Torad, N. L.; Imura, M.; Furukawa, S.; Yamauchi, Y. Thermal Conversion of Core-Shell Metal-Organic Frameworks: A New Method for Selectively Functionalized Nanoporous Hybrid Carbon. *J. Am. Chem. Soc.* 2015, 137, 1572-1580.

(7) Jiao, L.; Li, J.; Richard, L. L.; Sun, Q.; Stracensky, T.; Liu, E.; Sougrati, M. T.; Zhao, Z.; Yang, F.; Zhong, S.; Xu, H.; Mukerjee, S.; Huang, Y.; Cullen, D. A.; Park, J. H.; Ferrandon, M.; Myers, D. J.; Jaouen, F.; Jia, Q. Chemical Vapour Deposition of Fe—N—C Oxygen Reduction Catalysts with Full Utilization of Dense Fe—$N_4$ Sites. *Nat. Mater.* 2021, 20, 1385-1391.

(8) Lu, J.; Hai, X.; Xi, S.; Mitchell, S.; Harrath, K.; Xu, H.; Akl, D.; Kong, D.; Li, J.; Li, Z.; et al. Scalable Two-Step Annealing Method for Preparing Ultra-High-Density Single-Atom Catalyst Libraries. *Nat. Nanotechnol.* 2022, 17, 174-181.

(9) G. Brauer, in: *Handbook of Preparative Inorganic Chemistry*, Academic Press, New York, 1963, p. 1508.

(10) Bergerhoff, G. & Brown, I. D. in "Crystallographic Databases", F. H. Allen et al. (Hrsg.) Chester, International Union of Crystallography 1987

(11) Gerken, J. B.; Stamoulis, A.; Suh, S.-E.; Fischer, N. D.; Kim, Y. J.; Guzei, I. A.; Stahl, S. S. Efficient Electrochemical Synthesis of Robust, Densely Functionalized Water Soluble Quinones. *Chem. Commun.* 2020, 56, 1199-1202.

(12) Iglesia, E. Formic Acid Decomposition on Copper, Nickel, and Copper-Nickel Alloys. Thesis, Stanford University, 1981. Appendix B.

Those skilled in the art will recognize, or be able to ascertain using no more than routine experimentation, numerous equivalents to the specific materials and methods described herein. Such equivalents are considered to be within the scope of this invention and encompassed by the following claims.

We claim:

1. A method of making an M-N—C catalyst, the method comprising:

(a) contacting an N-doped carbon support comprising one or more macrocyclic $N_4$ sites with a basic solution, the basic solution comprising a metal salt and a base is selected from the group consisting of trialkyl amine, alkali acetate, and any combination thereof, at a temperature from 30° C. to 250° C., whereby the N-doped carbon support is metalated by the metal cation of the metal salt to form a metalated N-doped carbon support comprising one or more chelated metal-nitrogen complexes; and (b) contacting the metalated N-doped carbon support with an acid at a temperature from 20° C. to 60° C., whereby the one or more chelated metal-nitrogen complexes formed on the N-doped carbon support in step (a) remain intact.

2. The method of claim 1, wherein contacting the metalated N-doped carbon support with the acid in step (b) removes metal cations that are unselectively deposited onto or electrostatically adsorbed to the surface of the N-doped carbon support.

3. The method of claim 1, wherein the metal salt comprises a basic anion.

4. The method of claim 3, wherein the basic anion is selected from the group consisting of acetate and chloride.

5. The method of claim 1, wherein step (a) occurs at a temperature that is lower than 150° C., and wherein the basic solution comprises a strong base.

6. The method of claim 1, wherein the metal cation is selected from the group consisting of a $Ni^{2+}$, $Cu^{2+}$, $Zn^{2+}$, $Cr^{2+}$, $Mn^{2+}$, $Co^{2+}$, $Fe^{2+}$, $Fe^{3+}$, and any combination thereof.

7. The method of claim 1, wherein the acid is acetic acid.

8. The method of claim 1, further comprising the step of:

(c) heat treating the metalated N-doped carbon support formed in step (b), whereby the metalated N-doped carbon support becomes an activated M-N—C catalyst.

9. The method of claim 8, wherein step (c) is performed by heating the metalated N-doped carbon support formed in step (b) to a temperature of above 500° C.

10. The method of claim 1, wherein the N-doped carbon support is a product of heat treating a precursor mixture comprising one or more of ZIF-8 metal organic framework (MOF), polyaniline (PANI), 1,10-phenanthroline (Phen), and melamine (Mel).

11. The method of claim 1, further comprising heat treating a precursor mixture comprising carbon and nitrogen, thereby producing the N-doped carbon support comprising one or more macrocyclic $N_4$ sites.

12. The method of claim 1, wherein the M-N—C catalyst has a metal loading of from 0.3 wt % to 15 wt %, based on the total weight of the M-N—C catalyst.

* * * * *